(12) United States Patent
Han et al.

(10) Patent No.: US 10,725,498 B2
(45) Date of Patent: Jul. 28, 2020

(54) DISPLAY MODULE COUPLED WITH EXTERNAL MEMBER HAVING VARIABLE ADHESION PROPERTY THEREBETWEEN

(71) Applicant: Samsung Display Co., Ltd., Yongin-Si, Gyeonggi-Do (KR)

(72) Inventors: Jiwon Han, Anyang-si (KR); Jaiku Shin, Hwaseong-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 142 days.

(21) Appl. No.: 15/966,623

(22) Filed: Apr. 30, 2018

(65) Prior Publication Data

US 2019/0107866 A1 Apr. 11, 2019

(30) Foreign Application Priority Data

Oct. 10, 2017 (KR) .......................... 10-2017-0129131

(51) Int. Cl.
*G06F 1/16* (2006.01)
*G06F 3/041* (2006.01)
*G06F 3/047* (2006.01)

(52) U.S. Cl.
CPC .......... *G06F 1/1618* (2013.01); *G06F 1/1626* (2013.01); *G06F 1/1637* (2013.01); *G06F 1/1641* (2013.01); *G06F 1/1643* (2013.01); *G06F 1/1652* (2013.01); *G06F 3/047* (2013.01); *G06F 3/0412* (2013.01); *G06F 3/0416* (2013.01)

(58) Field of Classification Search
CPC .... G06F 1/1618; G06F 3/0412; G06F 1/1643; G06F 3/047; G06F 3/0416
See application file for complete search history.

(56) References Cited

U.S. PATENT DOCUMENTS

| 2009/0087655 | A1 | 4/2009 | Yamada et al. |
| 2014/0356567 | A1* | 12/2014 | Park .................... H01L 51/0013 428/77 |
| 2016/0237319 | A1 | 8/2016 | Takarada et al. |
| 2016/0291239 | A1* | 10/2016 | Lee ...................... G02B 6/0053 |
| 2018/0098442 | A1 | 4/2018 | Han |

FOREIGN PATENT DOCUMENTS

| JP | 2003177241 A | 6/2003 |
| KR | 101266712 B1 | 5/2013 |
| KR | 1020150138450 A | 12/2015 |
| KR | 1020160100826 A | 8/2016 |
| KR | 1020180037646 A | 4/2018 |

\* cited by examiner

*Primary Examiner* — Joseph L Williams
(74) *Attorney, Agent, or Firm* — Cantor Colburn LLP

(57) ABSTRACT

A display device includes a display module including a display surface on which an image is displayed and a rear surface facing the display surface, a lower protection member disposed below the rear surface of the display module, and an adhesion member disposed between the display module and the lower protrusion member to allow the display module and the lower protection member to adhere to each other. The adhesion member includes a first adhesion member disposed on the lower protection member and having first adhesion force and a second adhesion member disposed between the first adhesion member and the display module and having second adhesion force less than the first adhesion force.

20 Claims, 17 Drawing Sheets

DISPLAY MODULE COUPLED WITH EXTERNAL MEMBER HAVING VARIABLE ADHESION PROPERTY THEREBETWEEN

This application claims priority to Korean Patent Application No. 10-2017-0129131, filed on Oct. 10, 2017, and all the benefits accruing therefrom under 35 U.S.C. § 119, the content of which in its entirety is herein incorporated by reference.

BACKGROUND

1. Field

Exemplary embodiments of the invention herein relate to a display device, and more particularly, to a display device that is improved in reliability because of preventing defects of the display device due to bending or folding from occurring.

2. Description of the Related Art

In recent years, a bendable or foldable electronic device is being actively developed. Such a flexible electronic device includes an electronic panel, such as a flexible display panel or a flexible touch panel, and various external members. The external members have functions different from each other. The external members are disposed on at least one of a surface of the electronic device and another surface (e.g., opposite surface) of the electronic device. The external members are curved, bent, or folded together with the electronic device.

The external members are desired to have a relatively flexible property so as to be curved, bent, or folded.

SUMMARY

When each of external members has a flexible property, reliability with respect to stress due to a bending may be improved. However, reliability with respect to external impacts may be reduced to cause delamination of the external members from electronic device.

Exemplary embodiments of the invention provide a display device in which an occurrence of defects when being bent or folded is prevented, and an external protection member is not delaminated to improve reliability.

Exemplary embodiments of the invention also provide a display device in which an adhesion property between an external member and a display module varies to secure reworkability.

An exemplary embodiment of the invention provides a display device which includes a display module including a display surface on which an image is displayed and a rear surface facing the display surface, a lower protection member disposed below the rear surface of the display module, and an adhesion member disposed between the display module and the lower protrusion member to allow the display module and the lower protection member to adhere to each other, where the adhesion member includes a first adhesion member disposed on the lower protection member and having first adhesion force, and a second adhesion member disposed between the first adhesion member and the display module and having second adhesion force less than the first adhesion force.

In an exemplary embodiment, the second adhesion member may have a stress-relaxation ratio of about 35 to about 45.

In an exemplary embodiment, the second adhesion member may have a storage modulus less than that of the first adhesion member, and the second adhesion member may have a storage modulus of about $4.5 \times 10^4$ Pascal (Pa) to about $5.5 \times 10^4$ Pa.

In an exemplary embodiment, the first adhesion member may have a storage modulus that varies according to a temperature.

In an exemplary embodiment, the more the first adhesion member may increase in the temperature, the more the first adhesion member may decrease in the storage modulus, and the first adhesion member may have the storage modulus of about $4.5 \times 10^7$ Pa to about $5.5 \times 10^7$ Pa at a temperature of about -25 degrees Celsius (° C.).

In an exemplary embodiment, each of the first adhesion member and the second adhesion member may include a pressure sensitive adhesive ("PSA").

In an exemplary embodiment, the second adhesion member may include a PSA, and the first adhesion member may include a self assembled monolayer ("SAM").

In an exemplary embodiment, the display module may further include a display panel including a light emitting element, an optical member disposed on the display panel to convert light that is incident from an outside, an input detection member disposed on the optical member to detect touch applied from the outside and thereby to generate an electrical signal, a window member disposed on the input detection member to protect the display panel against an external impact, and a cover member disposed below the display panel to accommodate the display panel.

In an exemplary embodiment, the display module may include a first pressure sensitive adhesion layer disposed between the display panel and the cover member, a second pressure sensitive adhesion layer disposed between the display panel and the optical member, a third pressure sensitive adhesion layer disposed between the optical member and the input detection member and a fourth pressure sensitive adhesion layer disposed between the input detection member and the window member.

In an exemplary embodiment, each of the first to fourth pressure sensitive adhesion layers may have the second adhesion force less than the first adhesion force.

In an exemplary embodiment, the lower protection member may include a first protection member including a flat part having a central area and a peripheral area adjacent to the central area and a support part that protrudes upward from the flat part and a second protection member disposed between the first protection member and the display module and disposed on the support part so as to be spaced apart from the flat part with a predetermined distance, to define a predetermined inner space in the central area.

In an exemplary embodiment, the second protection member may include a flexible bending part, a first flat part connected to one end of the bending part and having rigidity relatively greater than that of the bending part, and a second flat part connected to an opposite end of the bending part and spaced apart from the first flat part with the bending part therebetween, the second flat part having rigidity relatively greater than that of the bending part.

In an exemplary embodiment, the bending part may include the same material as that of each of the first and second flat parts and include a plurality of protrusion patterns.

In an exemplary embodiment, the first protection member may include a first sub protection member overlapping the first flat part on a plane, and a second sub protection member overlapping the second flat part on the plane, where the first sub protection member and the second sub protection member may be spaced apart from each other on the plane.

In an exemplary embodiment, the first adhesion member may have a thickness of about 20 micrometers (μm) to about 80 μm, the second adhesion member may have a thickness of about 20 μm to about 80 μm, and the adhesion member may have a total thickness equal to or less than about 100 μm.

In an exemplary embodiment, the second adhesion member may have adhesion force of about 950 gram-force per inch (gf/inch) to about 1,050 gf/inch, and the first adhesion member may have adhesion force equal to or greater than about 1,050 gf/inch.

In an exemplary embodiment of the invention, a display device includes a display module that is folded with respect to a folding axis extending in one direction, a lower protection member disposed below the display module, and an adhesion member disposed between the display module and the lower protection member to allow the display module and the lower protection member to adhere to each other, where the adhesion member includes a first adhesion member disposed on the lower protection member and having first adhesion force and a second adhesion member disposed between the first adhesion member and the display module and having second adhesion force less than the first adhesion force.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1A:
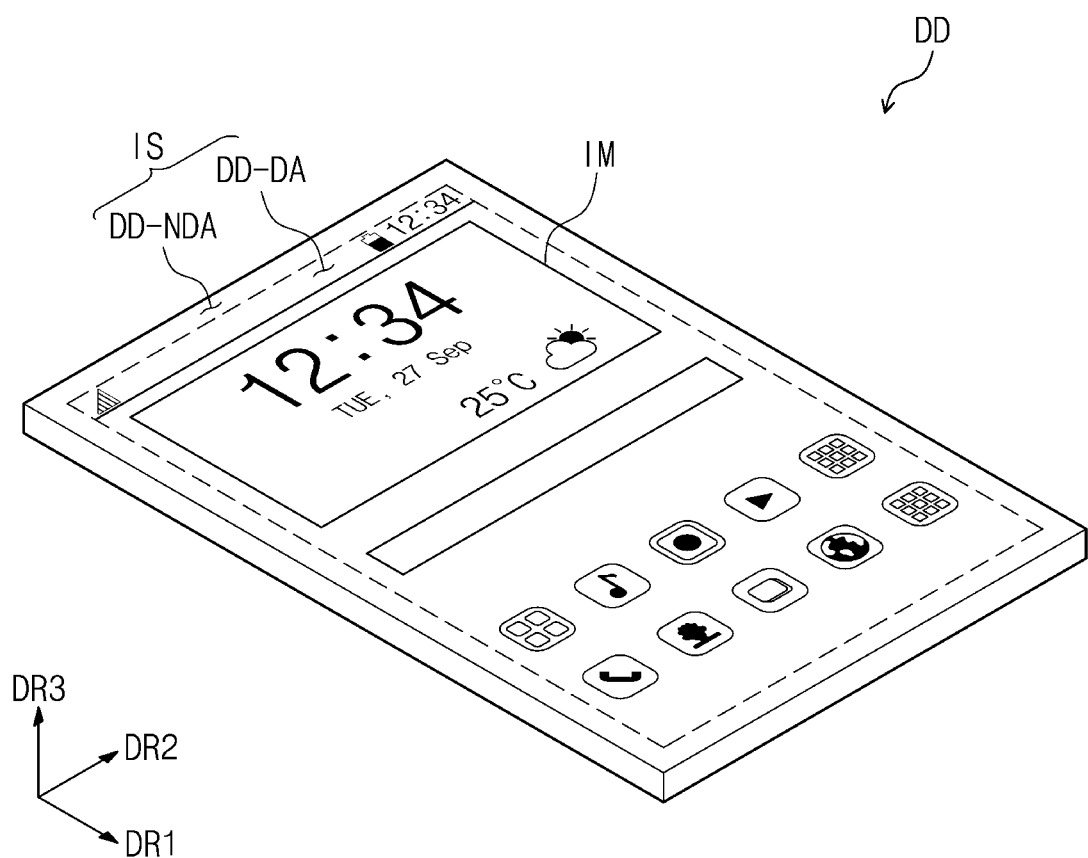
FIG. 1A is a perspective view of an exemplary embodiment of a display device according to the invention.

Hereinafter, embodiments of the invention will be described with reference to the accompanying drawings. In this specification, it will also be understood that when one component (or region, layer, portion, etc.) is referred to as being 'on', 'connected to', or 'coupled to' another component, it can be directly connected/coupled on/to the one component, or an intervening third component may also be present.

Like reference numerals refer to like elements throughout. Also, in the drawing figures, the thickness, ratio, and dimensions of components are exaggerated for clarity of illustration. The term "and/or" includes any and all combinations of one or more of the associated listed items.

It will be understood that although the terms such as 'first' and 'second' are used herein to describe various elements, these elements should not be limited by these terms. The terms are only used to distinguish one component from other components. For example, a first element referred to as a first element in one exemplary embodiment can be referred to as a second element in another exemplary embodiment without departing from the scope of the appended claims. The terms of a singular form may include plural forms unless referred to the contrary.

Also, ""under", "below", "above', "upper", and the like are used for explaining relation association of components illustrated in the drawings. The terms may be a relative concept and described based on directions expressed in the drawings.

The meaning of 'include' or 'comprise' specifies a property, a fixed number, a step, an operation, an element, a component or a combination thereof, but does not exclude other properties, fixed numbers, steps, operations, elements, components or combinations thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Hereinafter, exemplary embodiments of the invention will be described below in more detail with reference to the accompanying drawings. Hereinafter, a display device according to an exemplary embodiment of the invention will be described.

Figure 1B:
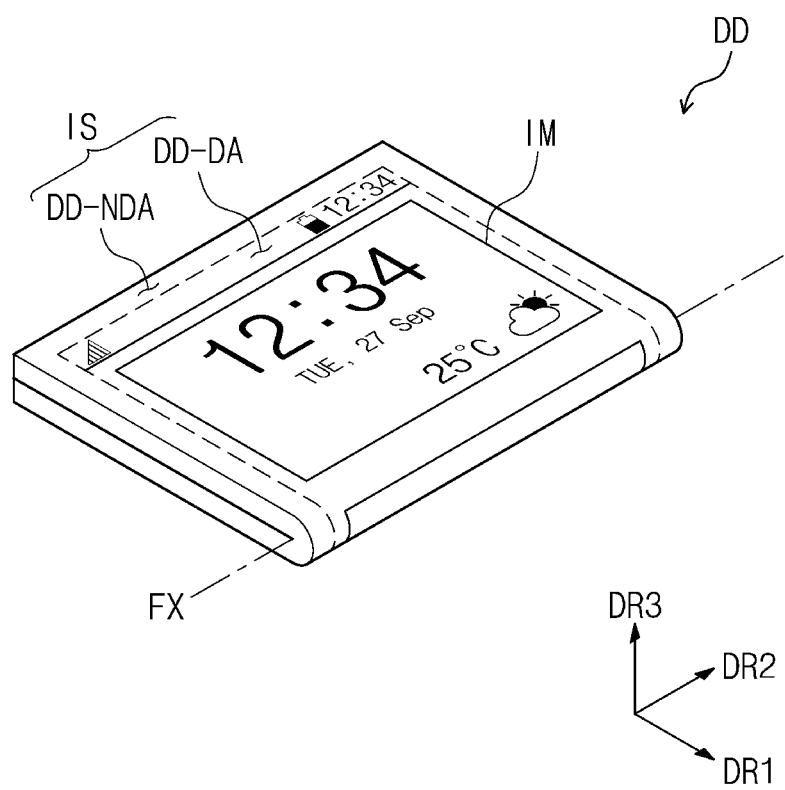
FIG. 1B is a perspective view illustrating a folded state of the display device illustrated in FIG. 1A.

FIG. 1A is a perspective view of a display device according to an exemplary embodiment of the invention. FIG. 1B is a perspective view illustrating a folded state of the display device illustrated in FIG. 1A. Hereinafter, a display device DD according to an exemplary embodiment of the invention will be described with reference to FIGS. 1A and 1B.

Referring to FIG. 1, the display device DD according to an exemplary embodiment of the invention includes a display surface IS on which an image is displayed. The display surface IS on which the image is displayed is parallel to a surface defined by a first direction DR1 and a second direction DR2. A normal direction of the display surface IS, i.e., a thickness direction of the display device DD is indicated as a third direction DR3. A front surface (or top surface) and a rear surface (or bottom surface) of each of members is defined by the third direction DR3. However, directions indicated as the first to third direction DR1, DR2, and DR3 may be a relative concept and thus changed into different directions.

The display device DD according to an exemplary embodiment of the invention may be a foldable display device or a rollable display device. The display device DD according to an exemplary embodiment of the invention may be used for large-sized electronic devices such as televisions and monitors and small and middle-sized electronic devices such as mobile phones, tablet personal computer ("PC"), navigation units for vehicles, game consoles, and smart watches.

The display surface IS of the display device DD according to an exemplary embodiment of the invention may include a plurality of areas. The display device DD includes a display area DD-DA on which an image IM is displayed and a non-display area DD-NDA that is adjacent to the display area DD-DA. The non-display area DD-NDA may be an area on which an image is not displayed. FIGS. 1A and 1B illustrate icons and a clock window of application as an example of the image IM. In an exemplary embodiment, the display area DD-DA may have a rectangular shape, for example. The non-display area DD-NDA may surround the display area DD-DA. However, the invention is not limited thereto. In an exemplary embodiment, the display area DD-DA and the non-display area DD-NDA may be relatively changed in shape, for example.

Referring to FIG. 1B, the display device DD according to an exemplary embodiment of the invention may be out-folded with respect to a folding axis FX. As the display device DD according to an exemplary embodiment of the invention is out-folded with respect to the folding axis FX, the display surface IS of the display device DD may be exposed to the outside, and a rear surface facing the display surface IS may be folded with respect to the folding axis FX. As a result, both rear surfaces that are divided with respect to the folding axis FX may be folded to face each other.

Figure 2A:
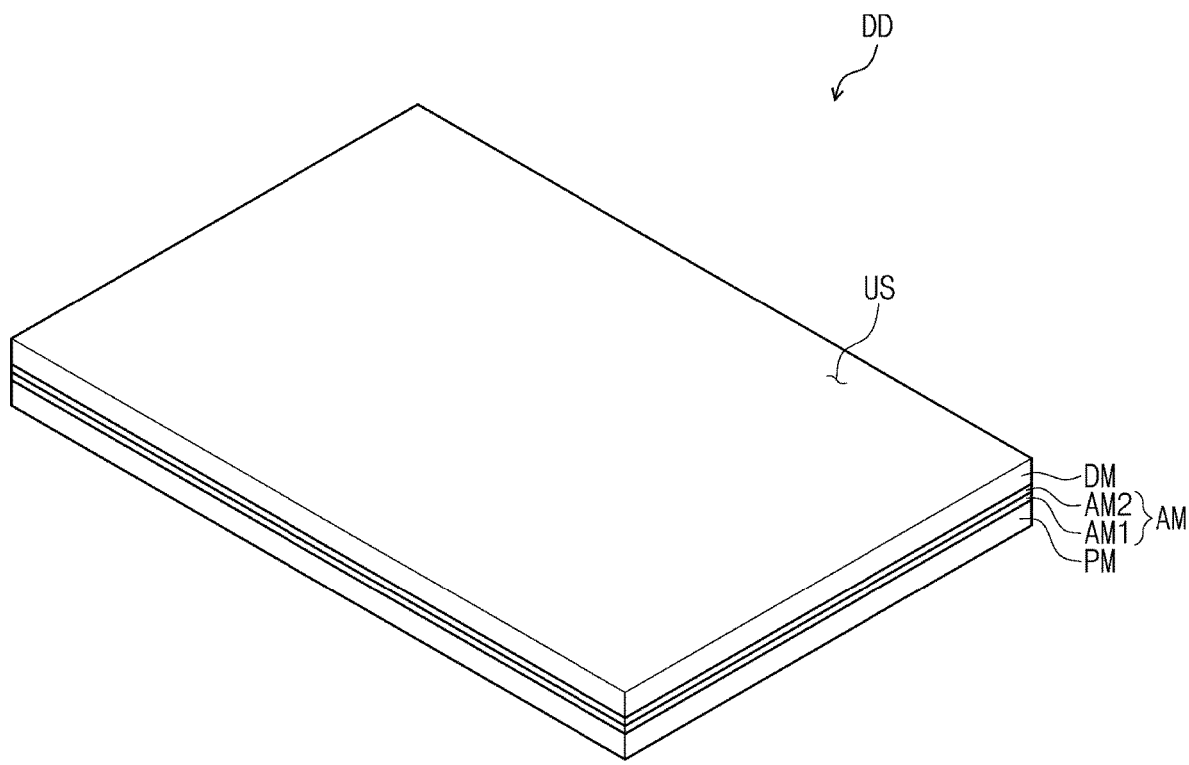
FIG. 2A is a perspective view of an exemplary embodiment of a display device according to the invention.
Figure 2B:
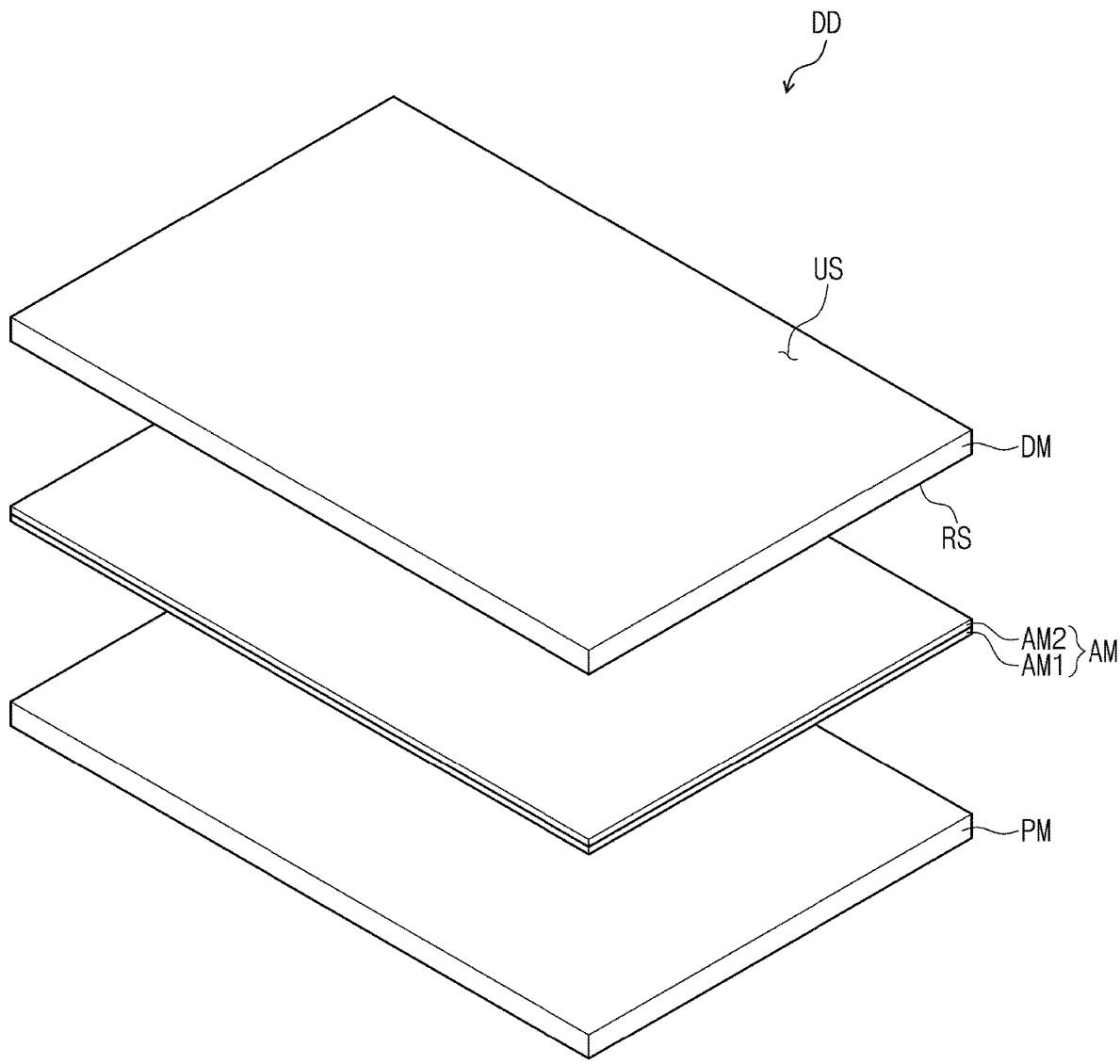
FIG. 2B is an exploded perspective view of an exemplary embodiment of the display device according to the invention.
Figure 2C:
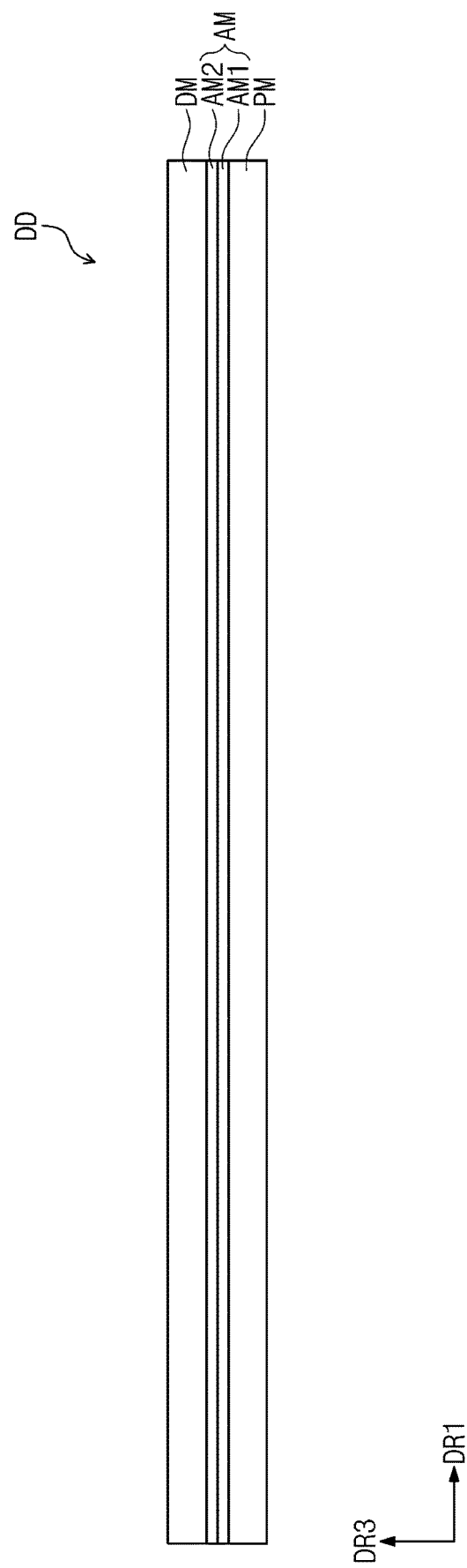
FIG. 2C is a cross-sectional view of an exemplary embodiment of the display device according to the invention.

FIG. 2A is a perspective view of a display device according to an exemplary embodiment of the invention. FIG. 2B is an exploded perspective view of the display device according to an exemplary embodiment of the invention. FIG. 2C is a cross-sectional view of the display device according to an exemplary embodiment of the invention. FIG. 2C illustrates a cross-section defined by the first direction DR1 and the third direction DR3. Hereinafter, the display device DD according to an exemplary embodiment of the invention will be described with reference to FIGS. 2A to 2C.

Referring to FIGS. 2A to 2C, the display device DD according to an exemplary embodiment of the invention includes a display module DM, a lower protection member PM, and an adhesion member AM.

The display module DM includes a top surface US and a rear surface RS facing the top surface US. The top surface US of the display module DM of FIGS. 2A and 2B may correspond to the display surface IS of FIG. 1A. That is, the top surface US of the display module DM may correspond to the display surface, on which an image is displayed, in the display device DD.

The lower protection member PM is disposed below the display module DM. The lower protection member PM is disposed in a direction of the rear surface RS of the display module DM and disposed below the rear surface RS of the display module DM. The lower protection member PM absorbs an external impact from a lower side to prevent the display module DM from being damaged by the external impact and also to prevent foreign substances from being introduced.

The adhesion member AM is disposed between the display module DM and the lower protection member PM. The adhesion member AM is disposed between the display module DM and the lower protection member PM to allow the display module DM and the lower protection member PM to adhere to each other.

The adhesion member AM includes a first adhesion member AM1 and a second adhesion member AM2. The first adhesion member AM1 is disposed on the lower protection member PM. The first adhesion member AM1 may be disposed to contact a top surface of the lower protection member PM.

The second adhesion member AM2 is disposed between the first adhesion member AM1 and the display module DM. The second adhesion member AM2 is disposed to contact a top surface of the first adhesion member AM1 and a bottom surface of the display module DM.

The first adhesion member AM1 and the second adhesion member AM2 may have adhesion force different from each other. The first adhesion member AM1 has first adhesion force, and the second adhesion member AM2 has second adhesion force. The second adhesion force is less than the first adhesion force. That is, in the adhesion member AM, the first adhesion member AM1, which is disposed below the second adhesion member AM2 and also disposed adjacent to the lower protection member PM, may have larger adhesion force than that of the second adhesion member AM2.

The second adhesion member AM2 may have a high stress-relaxation ratio. The second adhesion member AM2 may have a stress-relaxation ratio greater than that of the first adhesion member AM1. In an exemplary embodiment, the second adhesion member AM2 may have a stress-relaxation ratio of about 35 to about 45, for example. In this specification, the stress-relaxation ratio may mean a ratio of a stress-relaxation modulus, which is measured after a predetermined time period elapses, to an initial stress-relaxation modulus when deformation is removed after strain is applied to the adhesion member. In the exemplary embodiment, the stress-relaxation ratio may be defined as a ratio of a stress-relaxation modulus, which is measured after about 300 seconds elapses, to an initial stress-relaxation modulus after strain of about 25% of the adhesion member is maintained for about 100 seconds and then is removed, for example.

The second adhesion member AM2 may have a low storage modulus. The second adhesion member AM2 may have a storage modulus less than that of the first adhesion member AM1. In an exemplary embodiment, the second adhesion member AM2 may have a storage modulus of about $4.5 \times 10^4$ Pascal (Pa) to about $5.5 \times 10^4$ Pa at room temperature (about 20 degrees Celsius (° C.)), for example.

The display device DD according to an exemplary embodiment of the invention includes the double-layered adhesion member AM. Here, the second adhesion member AM2 disposed adjacent to the display module DM has a low storage modulus and a high stress-relaxation ratio. In an exemplary embodiment, the second adhesion member AM2 may have a storage modulus of about $4.5 \times 10^4$ Pa to about $5.5 \times 10^4$ Pa at room temperature (about 20° C.) and a stress-relaxation modulus of about 35 to about 45, for example. Since the second adhesion member AM2 disposed adjacent to the display module DM has the low storage modulus and the high stress-relaxation modulus, torque applied to the display device DD when the folding or bending occurs may be reduced, and compression strain of components provided in the display device DD may be reduced. Thus, stability of the display device DD due to the folding may be improved.

The first adhesion member AM1 may have a storage modulus that varies according to a temperature. Particularly, in the first adhesion member AM1, the more a temperature increases, the more a storage modulus may decrease, and whereas, the more a temperature decreases, the more a storage modulus may increase.

The first adhesion member AM1 may have a storage modulus greater than that of the second adhesion member AM2 under a low-temperature condition. In an exemplary embodiment, the first adhesion member AM1 may have a storage modulus of about $5.8 \times 10^4$ Pa to about $6.5 \times 10^4$ Pa at room temperature (about 20° C.) and a storage modulus of about $4.5 \times 10^7$ Pa to about $5.5 \times 10^7$ Pa under a low-temperature condition (about −25° C.), for example The first adhesion member AM1 has a property in which the storage modulus varies according to a temperature. Particularly, since the first adhesion member AM1 has a storage modulus significantly greater than that of the second adhesion member AM2 under the low-temperature condition, the display device DD according to an exemplary embodiment of the invention may realize rework of the lower protection member PM. In an exemplary embodiment, the first adhesion member AM1 has a storage modulus of about $4.5 \times 10^7$ Pa to about $5.5 \times 10^7$ Pa under the low-temperature condition (about −25° C.), for example. Thus, since a difference in storage modulus between the first adhesion member AM1 and the second adhesion member AM2 increases, the display module DM and the lower protection member PM, which adhere to each other through the adhesion member AM, may be detached from each other. Thus, when defects of the lower protection member PM occur, the lower protection member PM may be easily detached from the display module DM through the application of the low-temperature condition to improve the reworkability of the display device DD.

In an exemplary embodiment, the adhesion member AM may have a total thickness equal to or less than about 100 micrometers (μm), for example. In the exemplary embodiment, the first adhesion member AM1 may have a thickness of about 20 μm to about 80 μm, for example. In an exemplary embodiment, the second adhesion member AM2 may have a thickness of about 20 μm to about 80 μm, for example. It may be difficult to realize a slim display device DD when the total thickness of the adhesion member AM exceeds about 100 μm. When each of the adhesion members AM1 and AM2 has a thickness less than about 20 μm, it may be difficult to secure sufficient adhesion force. As a result, a defect, in which the adhesion member AM disposed between the display module DM and the lower protection member PM is delaminated from the lower protection member PM, may occur.

In an exemplary embodiment, the second adhesion member AM2 may have adhesion force of about 950 gf/inch to about 1,050 gf/inch, for example. The first adhesion member AM1 may have adhesion force greater than that of the second adhesion member AM2. In an exemplary embodiment, the first adhesion member AM1 may have adhesion force equal to or greater than about 1050 gf/inch, for example.

Each of the first adhesion member AM1 and the second adhesion member AM2 may be a PSA. The first adhesion member AM1 and the second adhesion member AM2 may be PSAs having different adhesion properties. The first adhesion member AM1 and the second adhesion member AM2 may be PSAs that are different in adhesion force, storage modulus, and stress-relaxation modulus.

In an alternative exemplary embodiment, the second adhesion member may be a PSA, and the first adhesion member AM1 may be a self assembled monolayer ("SAM"). The SAM may mean an organic monolayer that is voluntarily arranged and disposed on a surface of the solid such as the lower protection member. The SAM may include a head group that is chemically bonded to the surface of the solid such as the lower protection member, an alkyl chain which includes six or more carbon atoms to lengthily extend and in which monomoleculars are aligned through van der Waals interaction therebetween, and a terminal to which various kinds of functional groups are capable of being substituted. The first adhesion member AM1 may include a siloxane group having a silicon-oxygen covalent bond with the lower protective member as a head group. In an exemplary embodiment, the first adhesion member AM1 may be an alkylsiloxane-based SAM including a siloxane group as a head group, for example. In an exemplary embodiment, the first adhesion member AM1 may be a SAM provided by depositing monomolecules such as alkylalkoxysilane or alkylchlorosilane on the lower protection member PM through chemical vapor deposition ("CVD"), for example.

As the first adhesion member AM1 is provided as the SAM, the adhesion property of the first adhesion member AM1 may be adjusted by changing a substituent that is substituted at the terminal of the SAM. Thus, the adhesion force between the first adhesion member AM1 and the second adhesion member AM2 may be improved, and also, the defects in which the lower protection member PM is delaminated from the display module DM may be prevented from occurring.

Figure 3A:
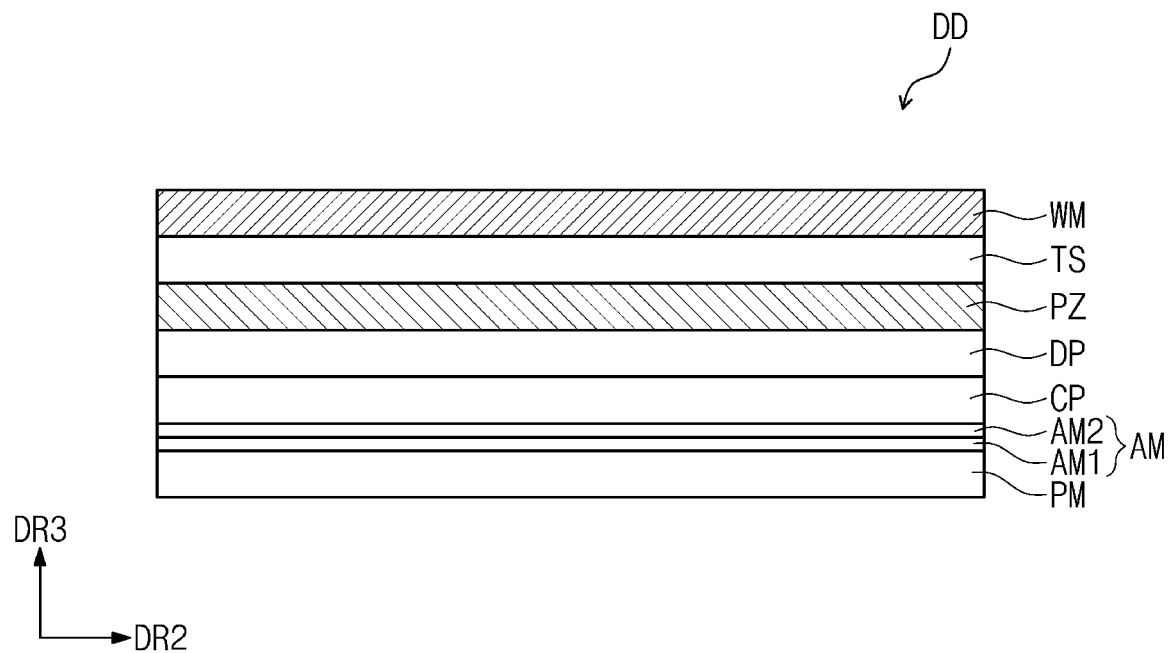
FIGS. 3A and 3B are cross-sectional views of an exemplary embodiment of the display device according to the invention.
Figure 3B:
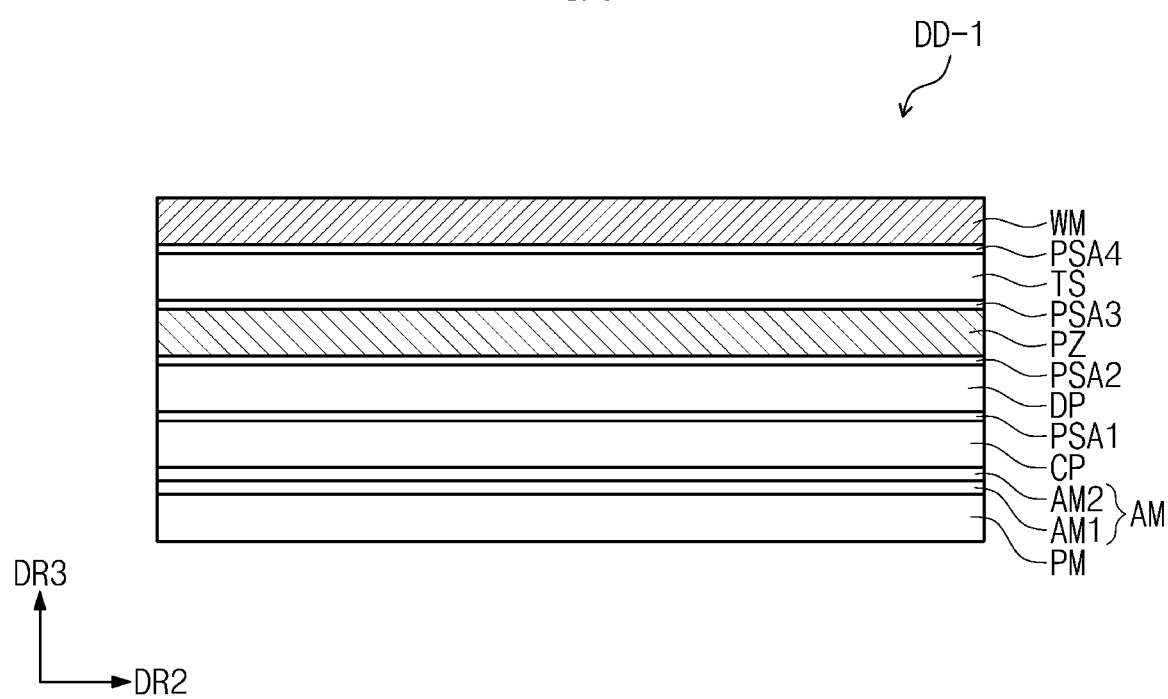

FIG. 3A is a cross-sectional view of a display device according to an exemplary embodiment of the invention. FIG. 3B is a cross-sectional view of a display device according to another exemplary embodiment of the invention. FIGS. 3A and 3B illustrate cross-sectional views illustrating embodied constituents of a display module (reference symbol DM of FIG. 2C) in display devices DD and DD-1 according to the invention. FIGS. 3A and 3B illustrate cross-sections defined by the second direction DR2 and the third direction DR3. Hereinafter, the display devices DD and DD-1 according to an exemplary embodiment of the invention will be described with reference to FIGS. 3A and 3B. The same constituents as those of FIGS. 2A to 2C are denoted by the same reference numeral, and their detailed descriptions will be omitted.

Referring to FIG. 3A, the display device DD may include a window member WM, an input detection member TS, an optical member PZ, a display panel DP, and a cover member CP. The window member WM, the input detection member TS, the optical member PZ, the display panel DP, and the cover member CP may constitute the display module (refer to reference symbol DM of FIG. 2C). The cover member CP, the display panel DP, the optical member PZ, the input detection member TS, and the window member WM may be sequentially laminated on the adhesion member AM disposed on the lower protection member PM.

The window member WM may protect the display panel DP against an external impact and provide an input surface to a user. The window member WM may provide an outer surface exposed to the outside. The display surface (refer to reference symbol IS of FIG. 1A) of the display device DD may correspond to the outer surface of the window member WM.

The window member WM may include a plastic film. The window member WM may have a multilayered structure. In an exemplary embodiment, the window member WM may have a multilayered structure including at least one of a glass substrate, a plastic film, and a plastic substrate, for example. The window member WM may further include a bezel pattern. The multilayered structure of the window member WM may be provided through a continuous process or an adhesion process using an adhesion layer.

The input detection member TS may detect touch applied from the outside to generate an electrical signal. The touch includes various types of external inputs such as body contact/adjacency, contact/adjacency of a conductive object, light, heat, a pressure, and the like. The input detection member TS may include sensors that are capable of detecting various inputs such as a conductive sensor, an optical sensor, a thermal sensor, and the like.

The optical member PZ optically converts incident light. The optical member PZ may reduce reflectivity of light incident into a front surface thereof, induce re-reflection of light incident into a rear surface thereof, or improve transmittance of the light incident into the rear surface thereof. In an exemplary embodiment, the optical member PZ may include at least one of a polarization film, an anti-reflection film, a phase difference film, and an anti-scatter film, for example.

In FIGS. 3A and 3B, the input detection member TS may be disposed on the optical member PZ, and the optical member PZ may be disposed adjacent to the display panel DP. However, the invention is not limited thereto. In an exemplary embodiment, the positions of the constituents may be changed, for example. In an exemplary embodiment, the input detection member TS may be disposed on the display panel DP, and the optical member PZ may be disposed on the input detection member TS, for example. The input detection member TS may be unitary on the display panel DP through a continuous process.

The display panel DP may include a plurality of pixels to generate the image (refer to reference symbol IM of FIG. 1A) corresponding to inputted image data. The display panel DP may generate an image to display the image in the thickness direction DR3 of the display device DD.

The cover member CP may be disposed below the display panel DP to protect the display panel DP and accommodate the display panel DP and other components. Although the cover member CP has a single-layered structure in FIGS. 3A and 3B, the invention is not limited thereto. In an exemplary embodiment, the cover member CP may include a bottom part and a sidewall part and accommodate the display panel DP and other components, for example. The cover member CP may be coupled to the window member WM. In an exemplary embodiment, the cover member CP may include glass, plastic, or metal, for example. The adhesion member AM may be disposed on a bottom surface of the cover member CP to adhere to the lower protection member PM by the adhesion member AM. The bottom surface of the cover member CP may correspond to the bottom surface (refer to reference symbol RS of FIG. 2B) of the display module DM.

Although not shown in FIGS. 3A and 3B, a protection film may be further provided between the display panel DP and the cover member CP. The protection film may protect the display panel DP. The protection film may prevent external moisture from being permeated and absorb an external impact. The protection film may include a plastic film as a base layer. In an exemplary embodiment, the protection film may include a plastic film including one of polyethersulphone ("PES"), polyacrylate ("PAR"), polyetherimide ("PEI"), polyethyelenen naphthalate ("PEN"), polyethyeleneterepthalate ("PET"), polyphenylene sulfide ("PPS"), polyallylate, polyimide ("PI"), polycarbonate ("PC"), poly (arylene ether sulfone), and a combination thereof, for example. However, a material for forming the protection film is not limited to plastic resins. In another exemplary embodiment, the protection film may include an organic/inorganic composite material, for example. The protection film may include a porous organic layer and an inorganic material that is filled into pores of the organic layer. The protection film may further include a film-functional layer disposed on a plastic film. The protection film may be continuously disposed on a lower portion of the display panel DP through a coating process.

Referring to FIG. 3B, a PSA may be disposed between the components of the display module. The components of the display module may adhere to each other by the PSA. Particularly, a first pressure sensitive adhesion layer PSA1 may be disposed between the cover member CP and the display panel DP, a second pressure sensitive adhesion layer PSA2 may be disposed between the display panel DP and the optical member PZ, a third pressure sensitive adhesion layer PSA3 may be disposed between the optical member PZ and the input detection member TS, and a fourth pressure sensitive adhesion layer PSA4 may be disposed between the input detection member TS and the window member WM.

Each of the first to fourth pressure sensitive adhesion layers PSA1, PSA2, PSA3, and PSA4 may include a PSA. Each of the first to fourth pressure sensitive adhesion layers PSA1, PSA2, PSA3, and PSA4 may include a photocurable adhesion material or a thermosetting adhesion material. Each of the first to fourth pressure sensitive adhesion layers PSA1, PSA2, PSA3, and PSA4 may have adhesion force similar to that of the second adhesion member AM2 of the adhesion member AM disposed below the cover member CP. Each of the first to fourth pressure sensitive adhesion layers PSA1, PSA2, PSA3, and PSA4 may have second adhesion force equal to that of the second adhesion member AM2. In an exemplary embodiment, each of the first to fourth pressure sensitive adhesion layers PSA1, PSA2, PSA3, and PSA4 may have adhesion force of about 950 gf/inch to about 1050 gf/inch, for example.

Figure 4A:
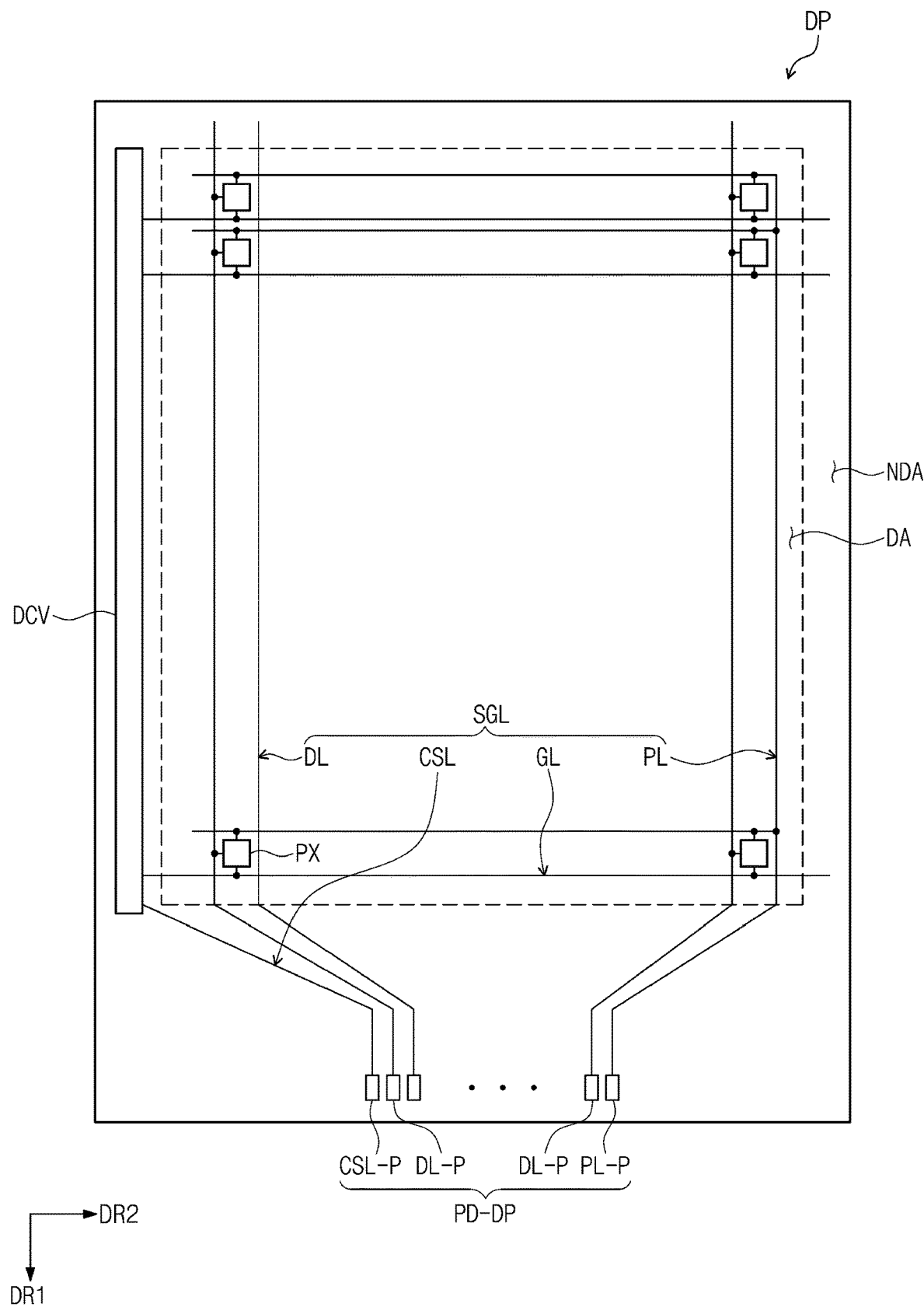
FIG. 4A is a plan view of an exemplary embodiment of a display panel provided in the display device according to the invention.
Figure 4B:
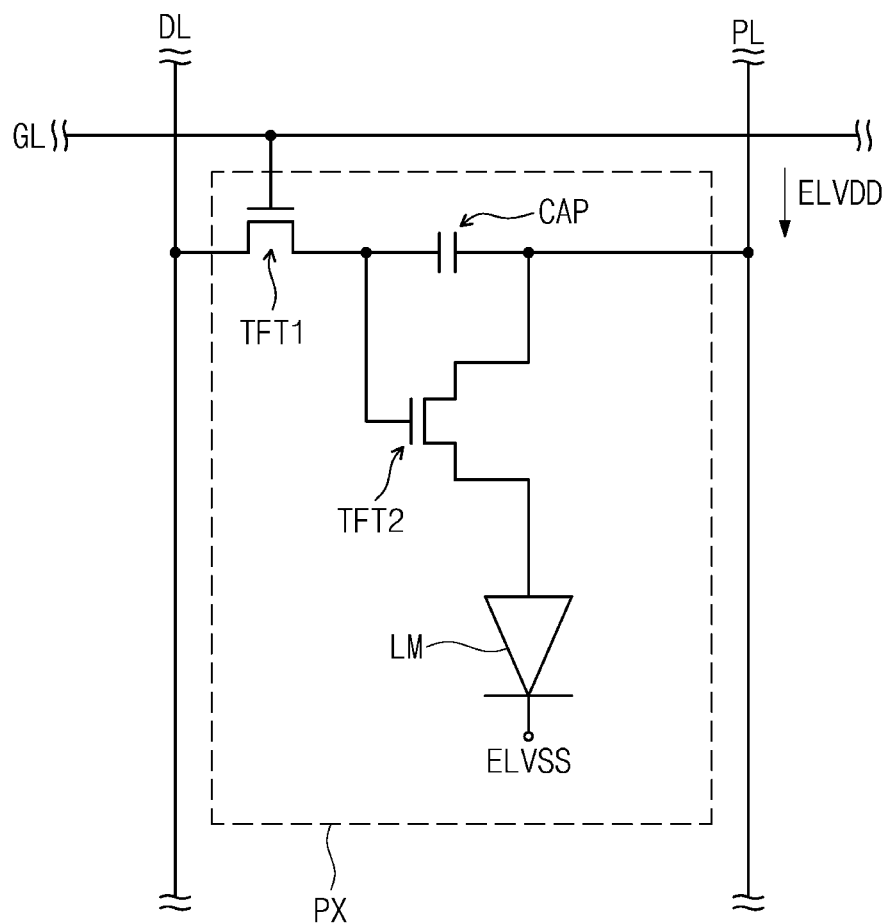
FIG. 4B is an equivalent circuit diagram illustrating an exemplary embodiment of one pixel of the display device according to the invention.
Figure 5A:
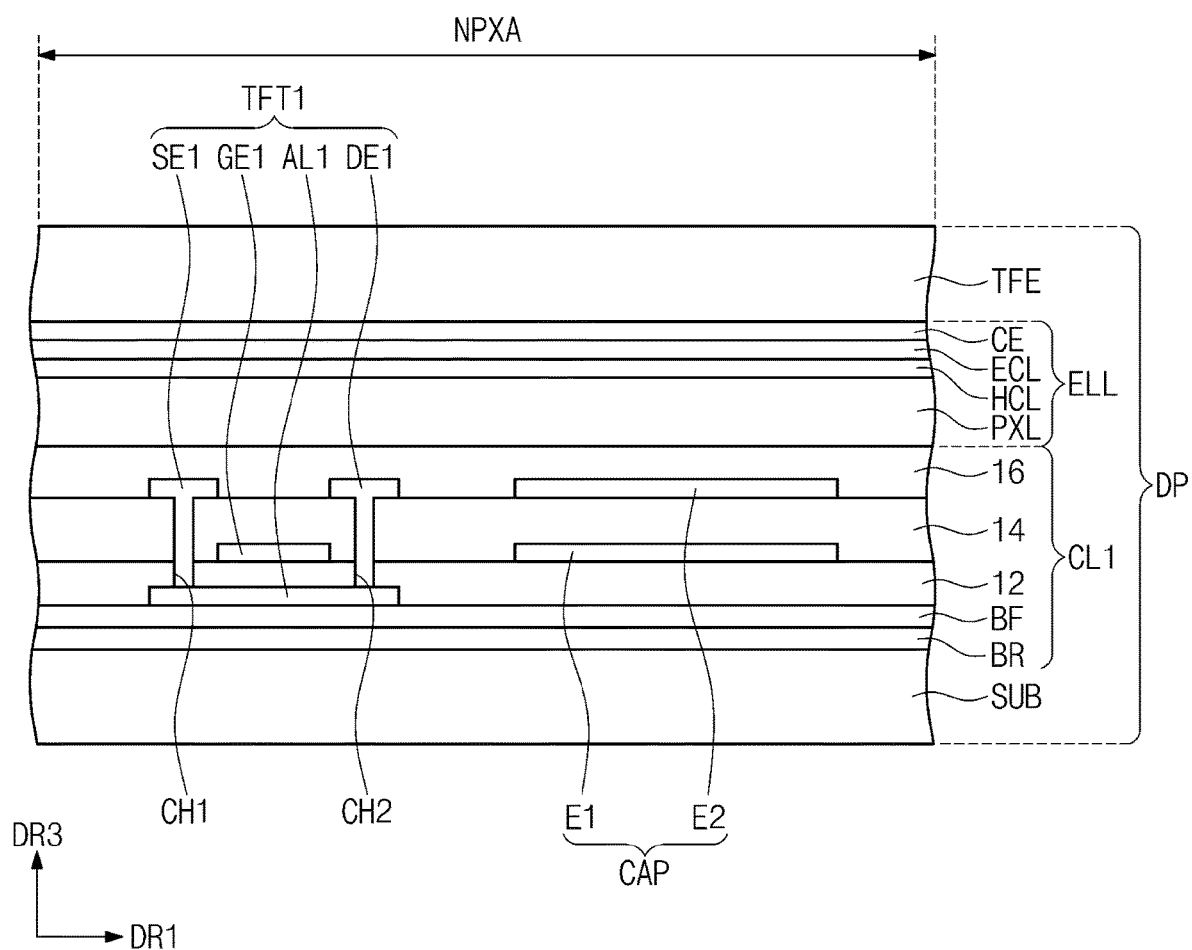
FIGS. 5A and 5B are partial cross-sectional views of an exemplary embodiment of the display panel according to the invention.
Figure 5B:
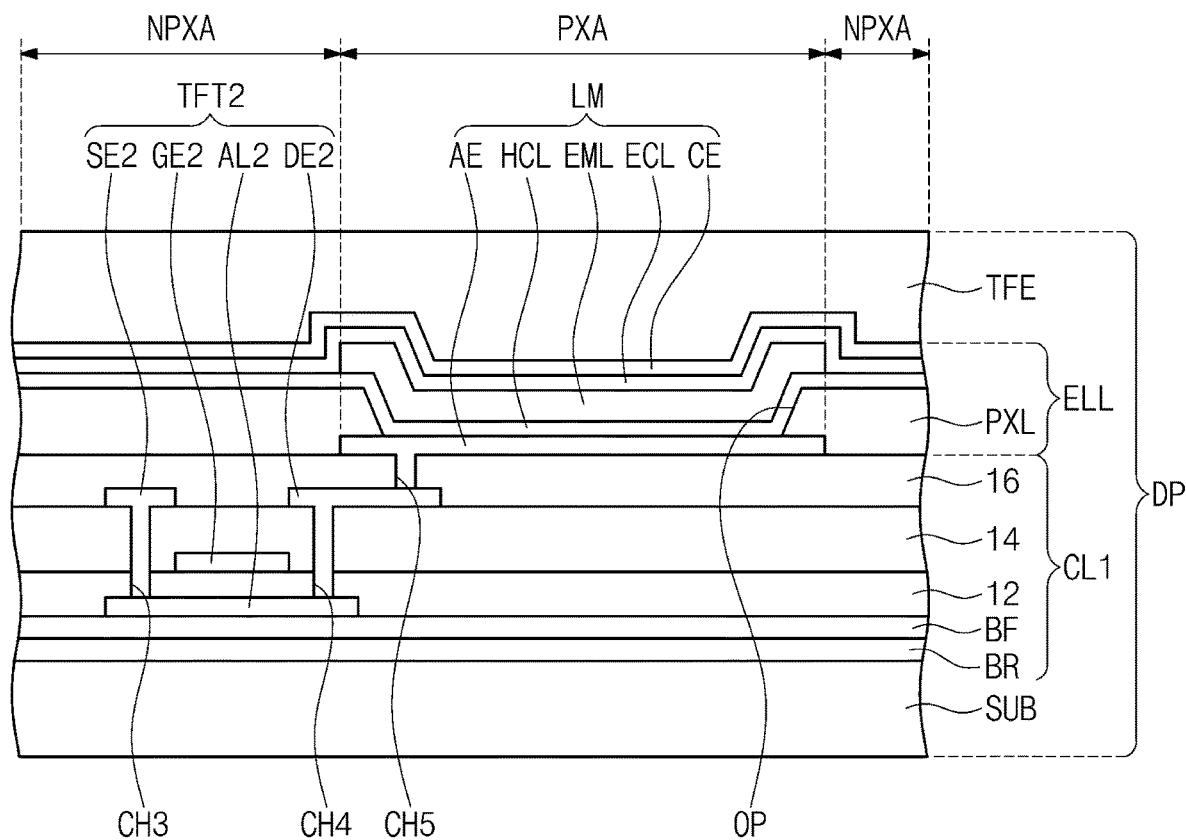

FIG. 4A is a plan view of the display panel provided in the display device according to an exemplary embodiment of the invention. FIG. 4B is an equivalent circuit diagram illustrating one pixel of the display device according to an exemplary embodiment of the invention. FIGS. 5A and 5B are partial cross-sectional views of the display panel according to an exemplary embodiment of the invention. Hereinafter, the display panel DP according to an exemplary embodiment of the invention will be described with reference to FIGS. 4A to 5B.

As illustrated in FIG. 4A, the display panel DP includes a display area DA and a non-display area NDA on a plane. The display area DA and the non-display area NDA of the display panel DP may correspond to the display area (refer to reference symbol DD-DA of FIG. 1A) and the non-display area (refer to reference symbol DD-NDA of FIG. 1A) of the display device (refer to reference symbol DD of FIG. 1A), respectively. It is unnecessary that the display area DA and the non-display area NDA of the display panel DP respectively correspond to the display area (refer to reference symbol DD-DA of FIG. 1A) and the non-display area (refer to reference symbol DD-NDA of FIG. 1A) of the display device (refer to reference symbol DD of FIG. 1A). In an exemplary embodiment, the display area DA and the non-display area NDA of the display panel DP may be changed according to a structure/design of the display device DD, for example.

The display panel DP includes a plurality of signal lines SGL and a plurality of pixels PX. An area on which the plurality of pixels PX is disposed may be defined as the display area DA. In this exemplary embodiment, the non-display area NDA may be defined along an edge of the display area DA.

The plurality of signal lines SGL includes gate lines GL, data lines DL, a power line PL, and a control signal line CSL. The gate lines GL are connected to corresponding pixels of the plurality of pixels PX, and the data lines DL are connected to corresponding pixels PX of the plurality of pixels PX, respectively. The power line PL is connected to the plurality of pixels PX. A gate driving circuit DCV to which the gate lines GL are connected may be disposed on one side (e.g., left side in FIG. 4A) of the non-display area NDA. The control signal line CSL may provide control signals to the gate driving circuit DCV.

Portions of the gate lines GL, the data lines DL, the power lines PL, and the control signal line CSL may be disposed on the same layer, and other portions may be disposed on layers different from each other. When the signal lines, which are disposed on one layer, of the gate lines GL, the data lines DL, the power lines PL, and the control signal line CSL are defined as a first signal line, the signal lines disposed on one different layer may be defined as a second signal line. The signal lines disposed on further another layer may be defined as a third signal line.

Each of the gate lines GL, the data lines DL, the power lines PL, and the control signal line CSL may include a signal line unit and display panel pads PD-DP connected to an end of the signal line unit. The signal line unit may be defined as portions except for the display panel pads PD-DP of each of the gate lines GL, the data lines DL, the power lines PL, and the control signal line CSL.

The display panel pads PD-DP may be provided through the same process as that for forming transistors that drive the pixels PX. In an exemplary embodiment, the transistors for driving the display panel pads PD-DP and the pixels PX may be provided through the same low temperature polycrystalline silicon ("LTPS") process or low temperature polycrystalline oxide ("LTPO") process, for example.

In an exemplary embodiment of the invention, the display panel pads PD-DP may include a control pad CSL-P, a data pad DL-P, and a power pad PL-P. Although the gate pad unit is not illustrated, the gate pad unit may overlap the gate driving circuit DCV and be connected to the gate driving circuit DCV. Although not particularly shown, a portion of the non-display area NDA on which the control pad CSL-P, the data pad DL-P, and the power pad PL-P are aligned may be defined as a pad area.

FIG. 4B illustrates an example of a pixel PX connected to one gate line GL, one data line DL, and the power line PL which is connected to a first power source ELVDD. However, an exemplary embodiment of the invention is not limited to the configuration of the pixel PX. In an exemplary embodiment, the pixel PX may be variously deformed in configuration, for example.

The pixel PX includes a light emitting element LM as a display element. In an exemplary embodiment of the invention, the light emitting element LM may be an organic light emitting diode, for example.

The light emitting element LM may be a top emission-type diode or a bottom emission-type diode. The pixel PX includes a first transistor TFT1 (also referred to as a switching transistor), a second transistor TFT2 (also referred to as a driving transistor), and a capacitor CAP as a circuit unit for driving the light emitting element LM. The light emitting element LM generates light by an electrical signal provided from the transistors TFT1 and TFT2. One end of the light emitting element LM may be connected to a second power source ELVSS.

The first transistor TFT1 outputs a data signal applied to the data line DL in response to a scanning signal applied to the gate line GL. The capacitor CAP charges a voltage corresponding to the data signal received from the first transistor TFT1.

The second transistor TFT2 is connected to the light emitting element LM. The second transistor TFT2 controls driving current flowing through the light emitting element LM to correspond to a charge amount stored in the capacitor CAP.

FIG. 5A is a cross-sectional view of portions corresponding to the first transistor TFT1 and the capacitor CAP of the equivalent circuit of FIG. 4B. FIG. 5B is a cross-sectional view of portions corresponding to the second transistor TFT2 and the light emitting element LM of the equivalent circuit of FIG. 4B.

As illustrated in FIGS. 5A and 5B, a first circuit layer CL1 is disposed on a base layer SUB. In an exemplary embodiment, the base layer SUB may include a plastic substrate, a glass substrate, a metal substrate, or an organic/inorganic composite substrate as a flexible substrate, for example.

A semiconductor pattern AL1 (hereinafter, referred to as a first semiconductor pattern) of the first transistor TFT1 and a semiconductor pattern AL2 (hereinafter, referred to as a second semiconductor pattern) of the second transistor TFT2 are disposed on the base layer SUB. In an exemplary embodiment, the first and second semiconductor patterns AL1 and AL2 may be equally or differently selected from amorphous silicon, polysilicon, and a metal oxide semiconductor, for example.

The first circuit layer CL1 includes organic/inorganic layers BR, BF, 12, 14, and 16. The first circuit layer CL1 may include a first transistor TFT1, a second transistor TFT2, and electrodes E1 and E2. The organic/inorganic layers BR, BF, 12, 14, and 16 may include functional layers BR and BF, a first insulation layer 12, a second insulation layer 14, and a third insulation layer 16.

The functional layers BR and BF may be disposed on one surface of the base layer SUB. The functional layers BR and BF may include at least one of a barrier layer BR or a buffer layer BF. The first and second semiconductor patterns AL1 and AL2 may be disposed on the barrier layer BR or the buffer layer BF.

The first insulation layer 12 covering the first and second semiconductor patterns AL1 and AL2 is disposed on the base layer SUB. The first insulation layer 12 includes an organic layer and/or an inorganic layer. Particularly, the first insulation layer 12 may include a plurality of inorganic thin films. In an exemplary embodiment, the plurality of inorganic thin films may include a silicon nitride layer, a silicon oxynitride layer, and a silicon oxide layer, for example.

A control electrode GE1 (hereinafter, referred to as a first control electrode) of the first transistor TFT1 and a control electrode GE2 (hereinafter, referred to as a second control electrode) of the second transistor TFT2 are disposed on the first insulation layer 12. A first electrode E1 of the capacitor CAP is disposed on the first insulation layer 12. The first control electrode GE1, the second control electrode GE2, and the first electrode E1 may be manufactured by the same photolithograph process as that of the gate lines (refer to reference symbol of FIG. 4A). That is, the first electrode E1 may include the same material as that of the gate lines GL, have the same laminated structure as the gate lines GL, and be disposed in the same layer as the gate lines GL.

A second insulation layer 14 covering the first and second control electrodes GE1 and GE2 and the first electrode E1 is disposed on the first insulation layer 12. The second insulation layer 14 includes an organic layer and/or an inorganic layer. Particularly, the second insulation layer 14 may include a plurality of inorganic thin films. In an exemplary embodiment, the plurality of inorganic thin films may include a silicon nitride layer, a silicon oxynitride layer, and a silicon oxide layer, for example.

The data lines (refer to reference symbol DL of FIG. 4A) may be disposed on the second insulation layer 14. An input electrode SE1 (hereinafter, referred to as a first input electrode) and an output electrode DE1 (hereinafter, referred to as a first output electrode) of the first transistor TFT1 are disposed on the second insulation layer 14. An input electrode SE2 (hereinafter, referred to as a second input electrode) and an output electrode DE2 (hereinafter, referred to as a second output electrode) of the second transistor TFT2 are disposed on the second insulation layer 14. The first input electrode SE1 is branched from a corresponding data line of the data lines DL. The power line (refer to reference symbol PL of FIG. 4A) may be disposed in the same layer as the data lines DL. The second input electrode SE2 may be branched from the power line PL.

A second electrode E2 of the capacitor CAP is disposed on the second insulation layer 14. The second electrode E2 may be manufactured by the same photolithograph process as that of each of the data line DL and the power line PL. Also, the second electrode E2 may include the same material, have the same structure, and be disposed in the same layer as that of each of the data line DL and the power line PL.

The first input electrode SE1 and the first output electrode DE1 are connected to the first semiconductor pattern AL1 through first and second through-holes CH1 and CH2, respectively, which pass through the first and second insulation layers 12 and 14. The first output electrode DE1 may be electrically connected to the first electrode E1. In an exemplary embodiment, the first output electrode DE1 may be connected to the first electrode E1 through a through-hole (not shown) passing through the second insulation layer 14. The second input electrode SE2 and the second output electrode DE2 are connected to the second semiconductor pattern AL2 through third and fourth through-holes CH3 and CH4, respectively, which pass through the first and second insulation layers 12 and 14. According to another exemplary embodiment of the invention, each of the first and second transistors TFT1 and TFT2 may be deformed into a bottom gate structure.

The third insulation layer 16 covering the first input electrode SE1, the first output electrode DE1, the second input electrode SE2, and the second output electrode DE2 is disposed on the second insulation layer 14. The third insulation layer 16 includes an organic layer and/or an inorganic layer. Particularly, the third insulation layer 16 may include an organic material to provide a flat surface.

In another exemplary embodiment, one of the first, second, and third insulation layers 12, 14, and 16 may be omitted according to the circuit structure of the pixel. Each of the second and third insulation layers 14 and 16 may be defined as an inter-dielectric layer. The inter-dielectric layer may be disposed between a lower conductive pattern, which is disposed below the inter-dielectric layer, and an upper conductive pattern, which is disposed above the inter-dielectric layer, to insulate the conductive patterns from each other.

The light emitting device layer ELL is disposed on the third insulation layer 16. The light emitting element layer ELL may include the light emitting elements LM.

A pixel defining layer PXL and the light emitting element LM are disposed on the third insulation layer 16. An anode AE is disposed on the third insulation layer 16. The anode AE is connected to the second output electrode DE2 through a fifth through-hole CH5 passing through the third insulation layer 16. An opening OP is defined in the pixel defining layer PXL. The opening OP of the pixel defining layer PXL exposes at least a portion of the anode AE.

The light emitting device layer ELL may include an emission area PXA and a non-emission area NPXA that is adjacent to the emission area PXA. The non-emission area NPXA may surround the emission area PXA. In this exemplary embodiment, the emission area PXA is defined to correspond to the anode AE. However, the exemplary embodiment of the invention is not limited to the above-described emission area PXA. That is, an area may be defined as the emission area PXA as long as light is emitted from the area. The emission area PXA may be defined to correspond to a portion of the anode AE, which is exposed by the opening OP.

A hole control layer HCL may be commonly disposed on the emission area PXA and the non-emission area NPXA. Although not particularly shown, a common layer such as the hole control layer HCL may be commonly disposed on the plurality of pixels PX (refer to FIG. 4A).

An organic light emitting layer EML is disposed on the hole control layer HCL. The organic light emitting layer EML may be disposed on only an area corresponding to the opening OP. That is, the organic light emitting layer EML may be separated from each of the plurality of pixels PX.

An electronic control layer ECL is disposed on the organic light emitting layer EML. A cathode CE is disposed on the electronic control layer ECL. The cathode CE is commonly disposed on the plurality of pixels PX.

Although the patterned organic light emitting layer EML is illustrated as an example in the current embodiment, the organic light emitting layer EML may be commonly disposed on the plurality of pixels PX. In an exemplary embodiment, the organic light emitting layer EML may emit white light, for example Also, the organic light emitting layer EML may have a multilayer structure. The organic light emitting layer EML may include an organic material or an inorganic material.

The thin film encapsulation layer TFE seals the light emitting element layer ELL. The thin film encapsulation layer TFE may include at least two inorganic thin films and an organic thin film disposed between the at least two inorganic thin films. The thin film encapsulation layer TFE may protect the light emitting element layer ELL against foreign substances such as moisture and dust particles.

In an exemplary embodiment of the invention, the thin film encapsulation layer TFE directly covers the cathode CE. The thin film encapsulation layer TFE may include an organic layer including an organic material and an inorganic layer including an inorganic material.

Figure 6A:
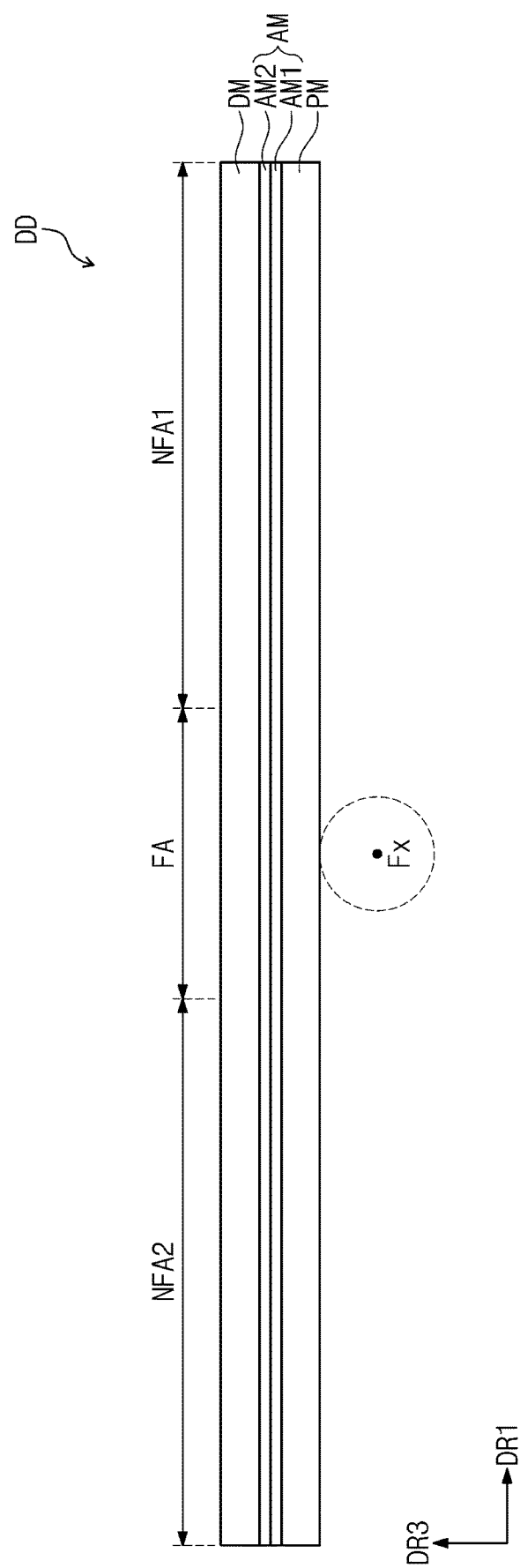
FIG. 6A is a cross-sectional view of an exemplary embodiment when the display device operates in a first mode according to the invention.
Figure 6B:
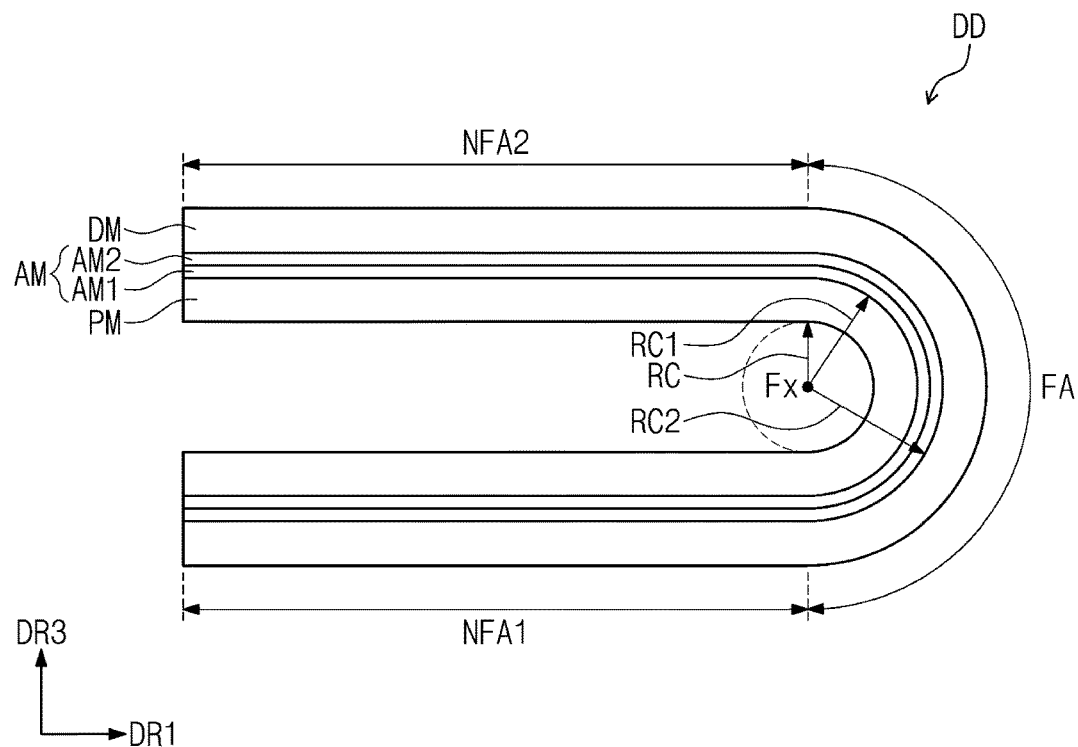
FIG. 6B is a cross-sectional view of an exemplary embodiment when the display device operates in a second mode according to the invention.
Figure 6C:
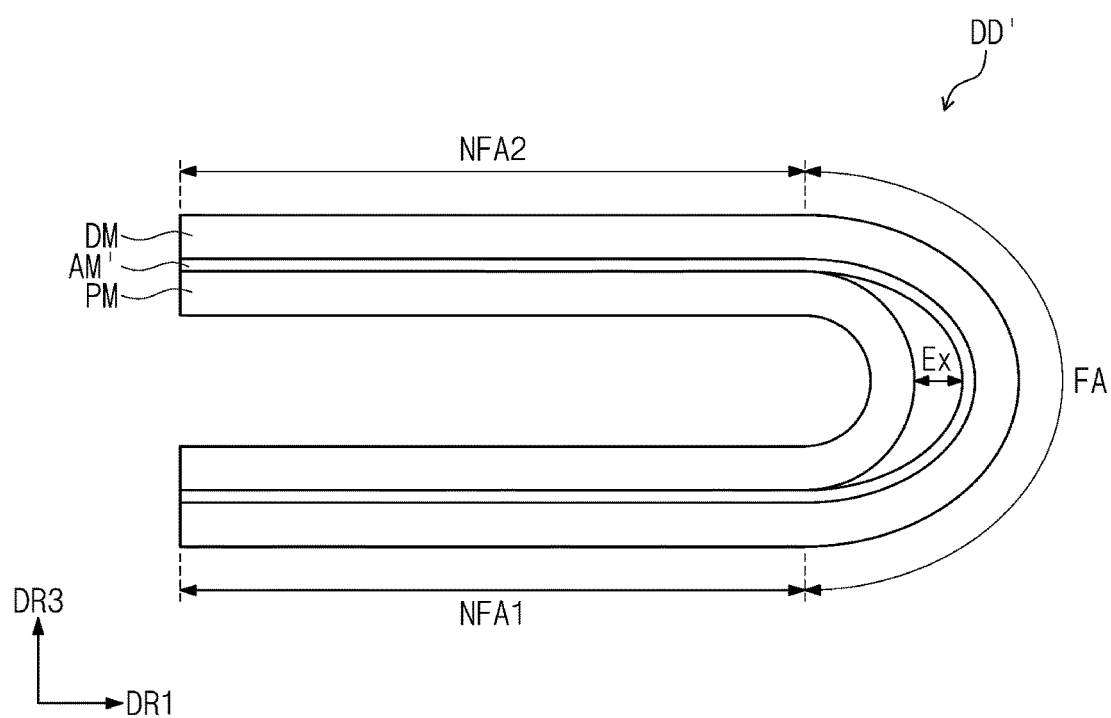
FIG. 6C is a cross-sectional view for explaining limitations that may occur in a foldable display device.

FIG. 6A is a cross-sectional view when the display device operates in a first mode according to an exemplary embodiment of the invention. FIG. 6B is a cross-sectional view when the display device operates in a second mode according to an exemplary embodiment of the invention. FIG. 6C is a cross-sectional view for explaining limitations that may occur in a foldable display device. Hereinafter, comparison between the display device DD according to an exemplary embodiment of the invention with a general foldable display device DD' will be described with reference to FIGS. 6A to 6C. The same constituents as those of FIGS. 2A to 2C are denoted by the same reference numeral, and their detailed descriptions will be omitted.

Referring to FIGS. 6A and 6B, the display device DD according to an exemplary embodiment of the invention may operate in a first mode or a second mode. As illustrated in FIG. 6A, in the first mode, the display device DD may be in a flat state in which the bending of the display device DD is spread. As illustrated in FIG. 6B, in the second mode, the display device DD may be in a state in which the display device DD is folded with respect to the folding axis FX.

The folding axis FX may be defined under the lower protection member PM. As the display device DD is folded along the folding axis FX defined under the lower protection member PM, the display device DD may be out-folded.

As the display device DD operates in the first mode in which the display device DD is flat and operates in the second mode in which the display device DD is folded, flat areas NFA1 and NFA2 and a folding area FA may be defined on the display device DD. The flat area may include a first flat area NFA1 and a second flat area NFA2, which are defined on both opposite sides of the folding area FA.

The folding area FA may correspond to an area that is bent in the second mode in which the display device DD is folded. The folding area FA may be an area that is relatively largely deformed when compared to the flat areas NFA1 and NFA2 in the second mode in which the display device DD is folded.

Each of the first flat area NFA1 and the second flat area NFA 2 may be an area on which deformation thereof is relatively small when compared to the folding area FA. Each of the first flat area NFA1 and the second flat area NFA2 may be an area that is maintained in the flat state without being deformed in shape in the second mode in which the display device DD is folded. That is, although the display device DD operates in the second mode, each of the first flat area NFA1 and the second flat area NFA2 may be an area that is maintained in shape without being deformed in the first mode.

The display device DD may be bent at a predetermined curvature radius RC in the second mode. The curvature radius RC may be defined as a minimum distance between the folding axis FX and the display device DD. Since the display device DD according to an exemplary embodiment of the invention corresponds to the display device that is out-folded in the second mode, the curvature radius RC may be a minimum distance between the folding axis FX and the bottom surface of the display device DD.

When the display device DD is folded with respect to the folding axis FX in the second mode, each of the lower protection member PM, the adhesion member AM, and the display module DM, which constitute the display device DD, may be bent with respect to the folding axis FX. The lower protection member PM, the adhesion member AM, and the display module DM may have curvature radiuses different from each other according to the distances spaced apart from the folding axis FX. More particularly, a curvature radius RC of the lower protection member PM, a curvature radius RC1 of the adhesion member AM, and a curvature radius RC2 of the display module DM may be different from each other. Since the display device DD according to an exemplary embodiment of the invention corresponds to the display device that is out-folded in the second mode, the lower protection member PM may have the smallest curvature radius RC, and the curvature radius RC1 of the adhesion member AM and the curvature radius RC2 of the display module DM may sequentially increase.

Referring to FIG. 6C, when the foldable display device DD' is folded, delamination between the components provided in the foldable display device may occur. Particularly, the delamination Ex between an adhesion layer AM' and a lower protection member PM may occur on the folding area FA in which the foldable display device DD' is folded. In the foldable display device DD', the adhesion layer AM' on which the display module DM and the lower protection member PM adhere to each other may have a low storage modulus. In the foldable display device DD', since the adhesion layer AM' provided as a single layer has the lowest elasticity, the adhesion layer AM' may have relatively low adhesion force. Thus, the delamination Ex between the components having curvature radii different from each other may occur when being folded. When the adhesion layer having high adhesion force is provided to prevent the delamination from occurring in the foldable display device DD', the storage modulus of the adhesion layer may increase to apply large compression deformation to each of the components provided in the display module DM, thereby causing defects of the display module DM.

The display device DD according to an exemplary embodiment of the invention includes the double-layered adhesion member AM. Here, the second adhesion member AM2 disposed adjacent to the display module DM has a relatively low storage modulus and a high stress-relaxation ratio, and the first adhesion member AM1 disposed adjacent to the lower protection member PM has relatively large adhesion force. In an exemplary embodiment, the second adhesion member AM2 may have a storage modulus of about $4.5 \times 10^4$ Pa to about $5.5 \times 10^4$ Pa at room temperature (about 20° C.) and a stress-relaxation modulus of about 35 to about 45, for example. In an exemplary embodiment, the first adhesion member AM1 may have adhesion force equal to or greater than about 1050 gf/inch, for example.

In the display device DD according to an exemplary embodiment of the invention, the first adhesion member AM1 disposed adjacent to the lower protection member PM has large adhesion force, even though the display device DD is folded in the second mode, the delamination between the components of the display device DD may be prevented due to the large adhesion force of the first adhesion member AM1.

Also, in the display device DD according to an exemplary embodiment of the invention, since the second adhesion member AM2 disposed adjacent to the display module DM has a low storage modulus and a high stress-relaxation ratio, when the display device DD is folded in the second mode, torque applied to the display module may be reduced, and thus, compression strain of each of the components of the display module may be reduced. More particularly, compression deformation occurring in the optical member (refer to reference symbol PZ of FIG. 3A) provided in the display module DM and the pressure sensitive adhesion layer disposed on each of upper and lower portions of the optical member may be reduced. Thus, the defects of the display module DM due to the folding may be prevented to improve safety of the display device DD.

Figure 7A:
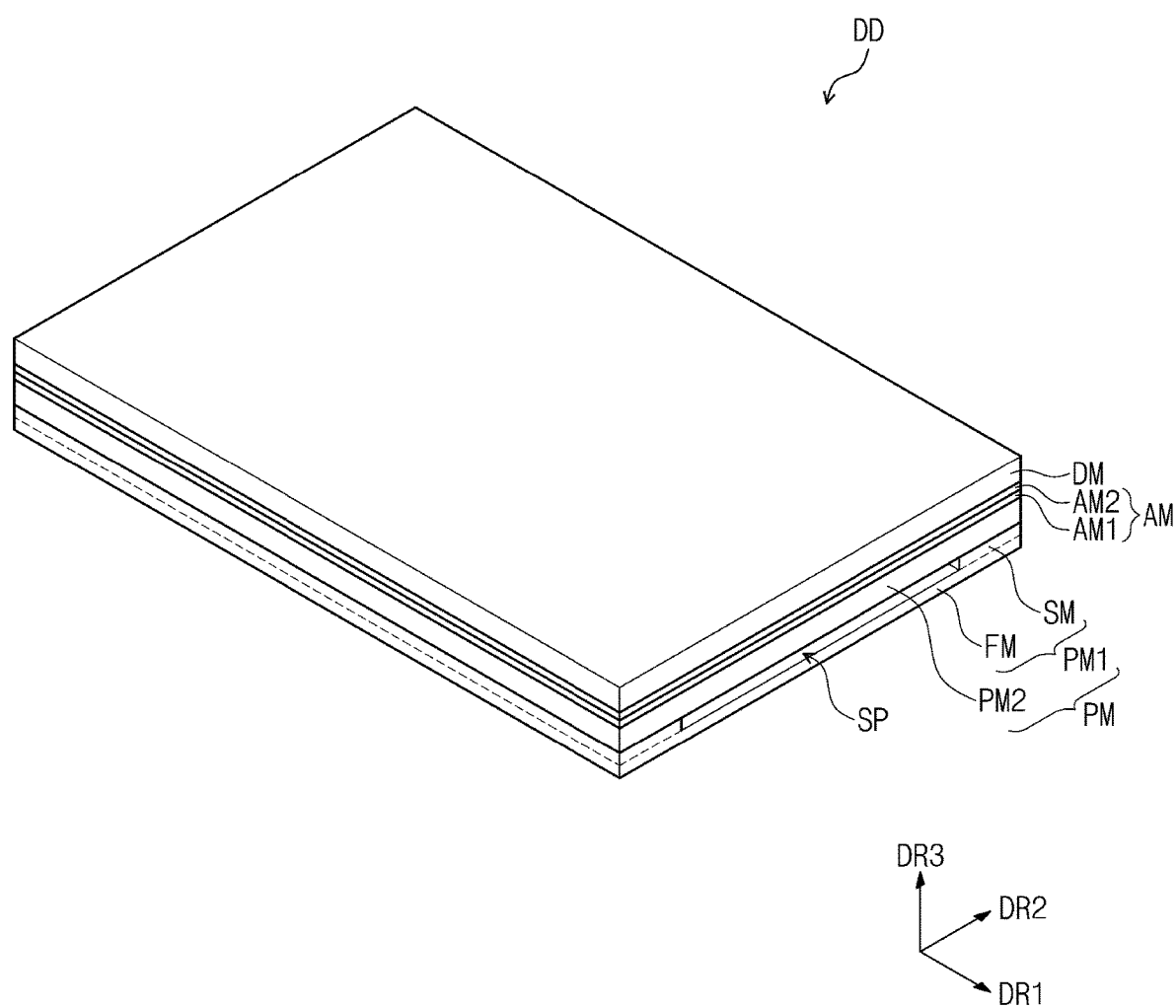
FIG. 7A is a perspective view of an exemplary embodiment of a display device according to the invention.
Figure 7B:
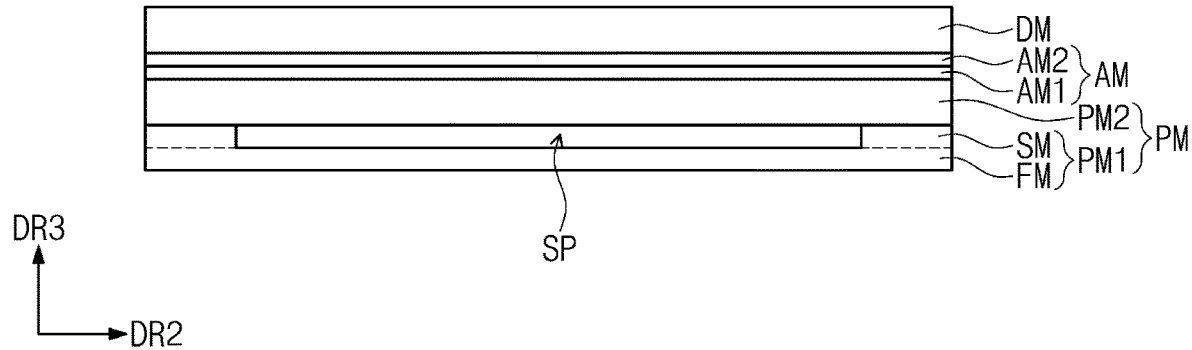
FIG. 7B is a cross-sectional view of an exemplary embodiment of the display device according to the invention.

FIG. 7A is a perspective view of a display device according to an exemplary embodiment of the invention. FIG. 7B is a cross-sectional view of the display device according to an exemplary embodiment of the invention. FIG. 7B illustrates a cross-section defined by the second direction DR2 and the third direction DR3. Hereinafter, a display device DD according to an exemplary embodiment of the invention will be described with reference to FIGS. 7A and 7B. The same constituents as those of FIGS. 2A to 2C are denoted by the same reference numeral, and their detailed descriptions will be omitted.

Referring to FIG. 7A, in the display device DD according to an exemplary embodiment of the invention, a lower protection member PM may include a first protection member PM1 and a second protection member PM2.

The first protection member PM1 includes a flat part FM and a support part SM. The flat part FM may have a central area and a peripheral area adjacent to the central area. The support part SM may be disposed on the peripheral area of the flat part FM to protrude from the flat part FM in the thickness direction DR3 of the display device DD. The support part SM may be disposed on each of both ends of the flat part and thus include two support parts that are spaced apart from each other in the second direction DR2. The support part SM may be unitary with the flat part FM. However, the invention is not limited thereto. In an exemplary embodiment, the support part SM may be provided as a separate component that is separated from the flat part FM, for example.

The first protection member PM1 may include a material having rigidity. In an exemplary embodiment, the first protection member PM1 may include a metal, for example. However, the invention is not limited thereto. In another exemplary embodiment, the first protection member PM1 may include plastic, for example.

The second protection member PM2 may be disposed on the first protection member PM1. The second protection member PM2 may be disposed between the first protection member PM1 and the display module DM to adhere to the display module DM by the adhesion member AM.

The second protection member PM2 may be disposed on the support part SM of the first protection member PM1. The second protection member PM2 may be supported by the support part SM and spaced apart from the flat part FM. As the second protection member PM2 is spaced apart from the flat part FM, a predetermined inner space SP may be defined in the central area of the flat part FM. The inner space SP may be defined by an inner surface of the support part SM of the first protection member PM1, a top surface of the flat part FM, and a bottom surface of the second protection member PM2.

The second protection member PM2 may overlap the support part SM on the plane. Although the second protection member PM2 entirely overlaps the support part SM in FIGS. 7A and 7B, the invention is not limited thereto. In an exemplary embodiment, the second protection member PM2 may overlap only a portion of the support part SM, for example.

The second protection member PM2 may include a material having rigidity. In an exemplary embodiment, the second protection member PM2 may include a metal, for example. However, the invention is not limited thereto. In another exemplary embodiment, the second protection member PM2 may include plastic, for example. The second protection member PM2 may include a material having a property that is superior to release heat generated in the display module DM. In an exemplary embodiment, the second protection member PM2 may include aluminum or molybdenum, for example.

The display module DM may adhere to the second protection member PM2 through the adhesion member AM. Although the display module DM and the second protection member PM2 entirely overlap each other on the plane in FIGS. 7A and 7B, the invention is not limited thereto. In an exemplary embodiment, the display module DM may overlap only a portion of the second protection member PM2 on the plane, for example. In an exemplary embodiment, the display module DM may be disposed to non-overlap an area, on which the support part SM of the first protection member PM1 is disposed, on the plane, for example. The display module DM may be disposed to overlap an area, in which the inner space SP is defined, on the plane.

In the display device DD according to an exemplary embodiment of the invention, as the display module DM is disposed on the inner space SP of the lower protection member PM, the inner space SP may absorb an impact to reduce an impact applied to the display module DM. Particularly, in the display device DD according to an exemplary embodiment of the invention, even though an external impact is applied to the display module DM, the inner space SP defined in the lower protection member PM may absorb the impact to reduce a repulsive impact that returns in the direction of the display module DM and thereby reduces an impact applied to the display module DM. Thus, the display module DM may be improved in impact resistance and reliability.

Figure 8A:
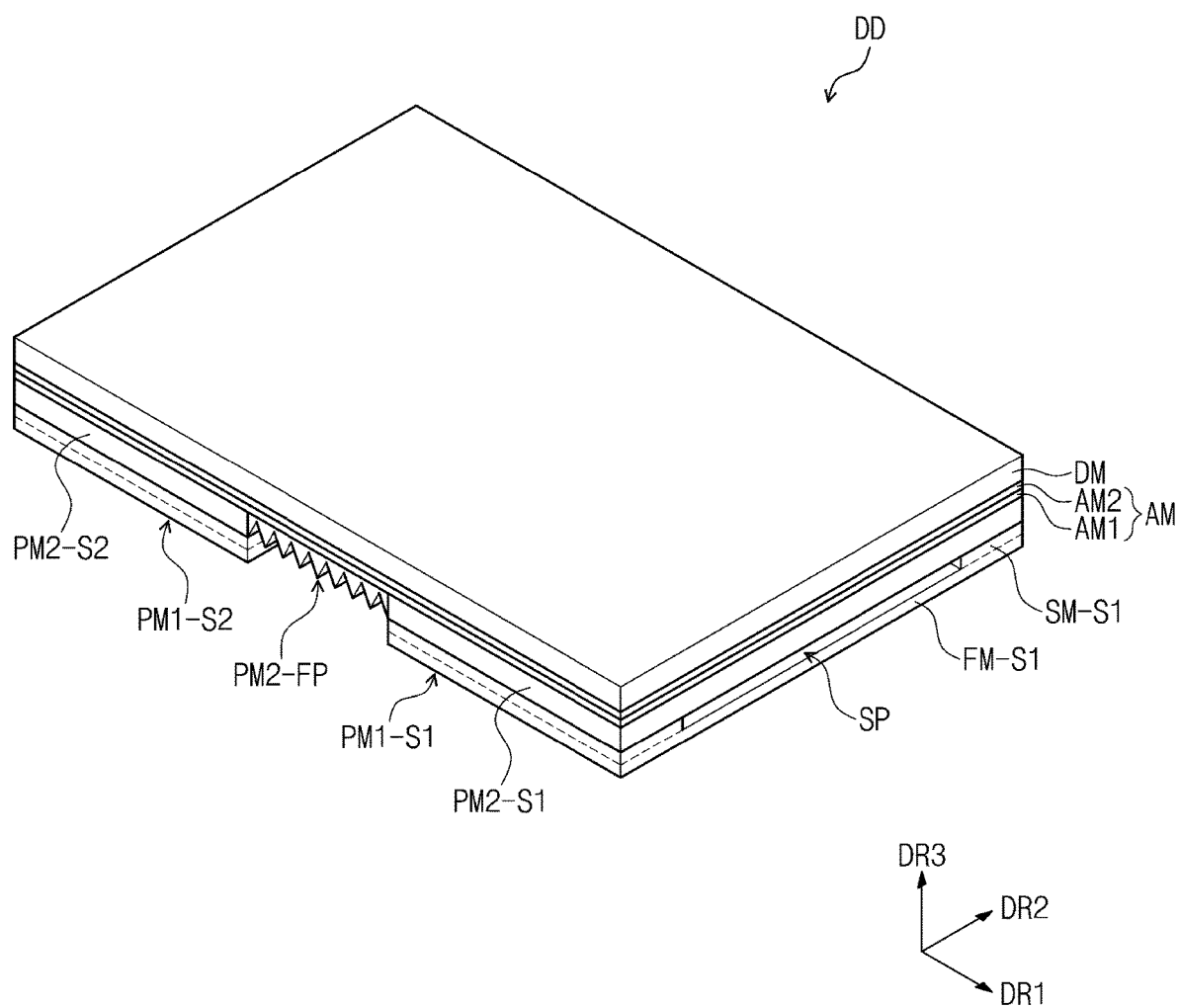
FIG. 8A is a perspective view of an exemplary embodiment of a display device according to the invention.
Figure 8B:
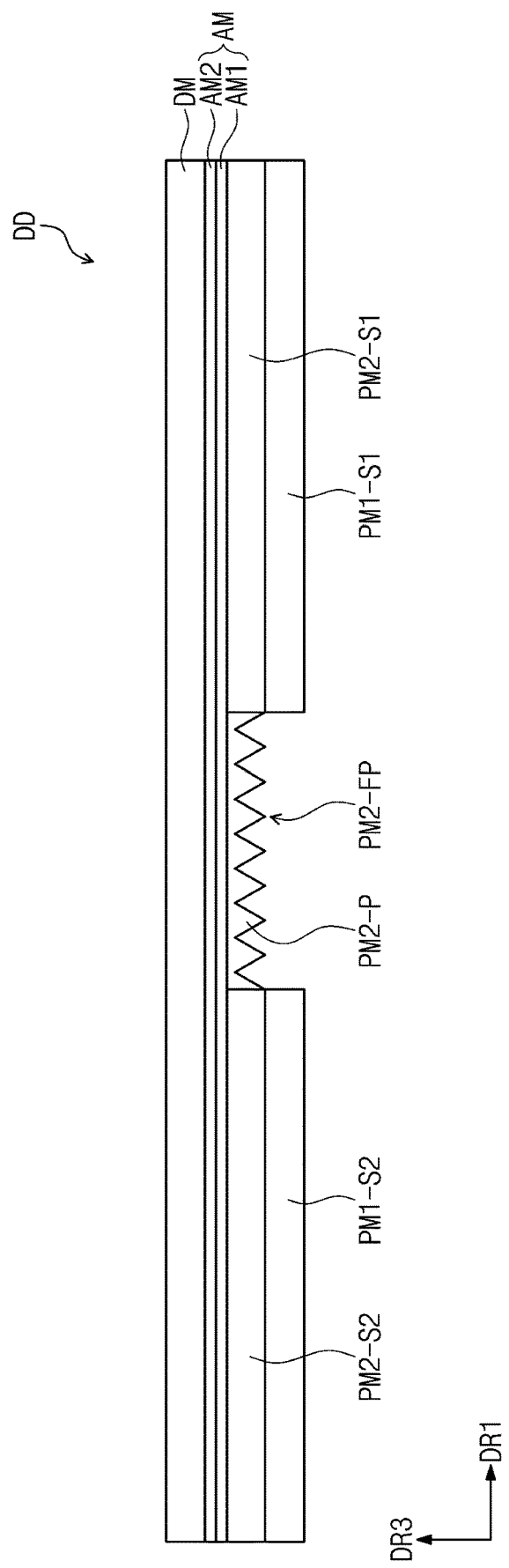
FIG. 8B is a cross-sectional view of an exemplary embodiment of the display device according to the invention.
Figure 8C:
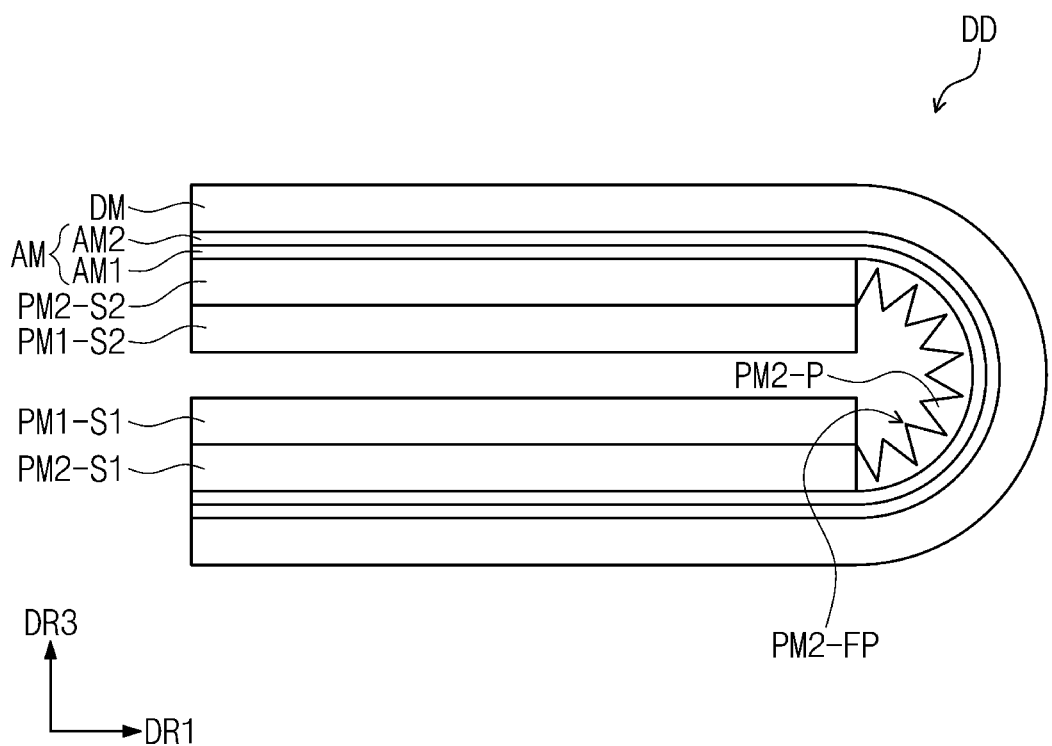
FIG. 8C is a cross-sectional view illustrating a folded state of the display device illustrated in FIG. 8B.

FIG. 8A is a perspective view of a display device according to an exemplary embodiment of the invention. FIG. 8B is a cross-sectional view of the display device according to an exemplary embodiment of the invention. FIG. 8C is a cross-sectional view illustrating a folded state of the display device illustrated in FIG. 8B. FIGS. 8B and 8C illustrate cross-sections defined by the first direction DR1 and the third direction DR3. Hereinafter, the display device DD according to an exemplary embodiment of the invention will be described with reference to FIGS. 8A to 8C. The same constituents as those of FIGS. 7A and 7B are denoted by the same reference numeral, and their detailed descriptions will be omitted.

Referring to FIGS. 8A to 8C, in the display device DD according to an exemplary embodiment of the invention, a second protection member PM2 (refer to FIG. 7A) may include a bending part PM2-FP, a first flat part PM2-S1, and a second flat part PM2-S2. The first flat part PM2-S1, the bending part PM2-FP, and the second flat part PM2-S2 may be sequentially arranged in the first direction DR1.

The bending part PM2-FP may have a relatively flexible property when compared to the first flat part PM2-S1 and the second flat part PM2-S2. The second protection member PM2 may be bent or folded by the bending part PM2-FP.

The bending part PM2-FP may be bent or folded in various manners. In an exemplary embodiment, the bending part PM2-FP may include a material having high flexibility, for example. In an alternative exemplary embodiment, the bending part PM2-FP may have a shape that is deformable by external force.

The first flat part PM2-S1 may be connected to one end of the bending part PM2-FP. The first flat part PM2-S1 may have relatively large rigidity when compared to the bending part PM2-FP. The second flat part PM2-S2 may be connected to the other end of the bending part PM2-FP and spaced apart from the first flat part PM2-S1 in the first direction DR1 with the bending part PM2-FP therebetween. The second flat part PM2-S2 may have relatively large rigidity when compared to the bending part PM2-FP.

The first protection member PM1 (refer to FIGS. 7A and 7B) may include a first sub protection member PM1-S1 and a second sub protection member PM1-S2. The first sub protection member PM1-S1 and the second sub protection member PM1-S2 may be spaced apart from each other on the plane. The first sub protection member PM1-S1 and the second sub protection member PM1-S2 may be spaced apart from each other in the first direction DR1.

The first sub protection member PM1-S1 may overlap the first flat part PM2-S1. The first flat part PM2-S1 may be disposed to entirely overlap the first sub protection member PM1-S1. The second sub protection member PM1-S2 may overlap the second flat part PM2-S2. The second flat part PM2-S2 may be disposed to entirely overlap the second sub protection member PM1-S2.

The display device DD may operate in the first mode that is in the flat state as illustrated in FIG. 8B and operate in the second mode that is in the folded state as illustrated in FIG. 8C.

The bending part PM2-FP may include the same material as that of the first flat part PM2-S1 and the second flat part PM2-S2. The bending part PM2-FP may have a shape that is substantially integrated with the first flat part PM2-S1 and the second flat part PM2-S2.

The bending part PM2-FP may include a plurality of protrusion patterns PM2-P. The plurality of protrusion patterns PM2-P may provide grooves that extend in the second direction DR2 to define predetermined spaces in the first direction.

The plurality of protrusion patterns PM2-P may have various shapes on the cross-section defined by the first and third directions DR1 and DR3. In an exemplary embodiment, each of the plurality of protrusion patterns PM2-P may have a triangular shape, an isosceles trapezoid shape, or a semicircular shape, for example. The flat part FM-S1 and the support part SM-S1 may be similar to the flat part FM and the support part SM of FIG. 7B, respectively, and thereby a detailed description may be omitted. FIGS. 8B and 8C illustrate examples in which each of the plurality of protrusion patterns PM2-P has the triangular shape on the plane.

In the display device according to an exemplary embodiment of the invention, the first protection member PM1 may include a first sub protection member PM1-S1 and a second sub protection member PM1-S2. The first sub protection member PM1-S1 and the second sub protection member PM1-S2 may be spaced apart from each other in the first direction DR1. As the first sub protection member PM1-S1 and the second sub protection member PM1-S2 are spaced apart from each other, the first protection member PM1 having the rigidity may be, for example, broken when being out-folded.

In the display device according to an exemplary embodiment of the invention, the second protection member PM2 may include a bending part PM2-FP, and the bending part PM2-FP may include a plurality of protrusion patterns PM2-P. Since a predetermined distance is defined between the plurality of protrusion patterns PM2-P and also is reduced when the display device is bent or folded, stress due to the bending at each of the protrusion patterns PM2-P may be reduced. Thus, the second protrusion member PM2 having the rigidity may be broken when being out-folded.

According to the display device according to the exemplary embodiment of the invention, the defects of the display module may not occur when being bent or folded, and the external protection member may not be delaminated from the display module.

According to the display device according to the exemplary embodiment of the invention, the adhesion property between the external member and the display module may vary by adjusting the temperature to realize the rework of the display device.

It will be apparent to those skilled in the art that various modifications and variations may be made in the invention. Thus, it is intended that the invention covers the modifications and variations of this invention provided they come within the scope of the appended claims and their equivalents. Hence, the real protective scope of the invention shall be determined by the technical scope of the accompanying claims.

What is claimed is:
1. A display device comprising:
a display module comprising a display surface on which an image is displayed and a rear surface facing the display surface;
a lower protection member disposed below the rear surface of the display module; and
an adhesion member disposed between the display module and the lower protection member such that the display module and the lower protection member adhere to each other, the adhesion member comprising:
a first adhesion member disposed on the lower protection member and having first adhesion force; and
a second adhesion member disposed between the first adhesion member and the display module and having second adhesion force less than the first adhesion force and
wherein the second adhesion member comprises a pressure sensitive adhesive.
2. The display device of claim 1, wherein the second adhesion member has a stress-relaxation ratio of about 35 to about 45.
3. The display device of claim 1, wherein the second adhesion member has a storage modulus less than that of the first adhesion member, and
the second adhesion member has a storage modulus of about $4.5 \times 10^4$ Pascal to about $5.5 \times 10^4$ Pascal.
4. The display device of claim 3, wherein the first adhesion member has a storage modulus which varies according to a temperature.
5. The display device of claim 4, wherein the more the first adhesion member increases in the temperature, the more the first adhesion member decreases in the storage modulus, and
the first adhesion member has the storage modulus of about $4.5 \times 10^7$ Pascal to about $5.5 \times 10^7$ Pascal at the temperature of about −25 degrees Celsius.
6. The display device of claim 1, wherein the first adhesion member comprises a pressure sensitive adhesive.
7. The display device of claim 1, wherein the first adhesion member comprises a self assembled monolayer.
8. The display device of claim 1, wherein the display module further comprises:
a display panel comprising a light emitting element;
an optical member which is disposed on the display panel and converts light which is incident from an outside;

an input detection member which is disposed on the optical member, detects touch applied from the outside and thereby generates an electrical signal;

a window member which is disposed on the input detection member and protects the display panel against an external impact; and a cover member which is disposed below the display panel and accommodates the display panel.

9. The display device of claim 8, wherein the display module comprises:

a first pressure sensitive adhesion layer disposed between the display panel and the cover member;

a second pressure sensitive adhesion layer disposed between the display panel and the optical member;

a third pressure sensitive adhesion layer disposed between the optical member and the input detection member; and a fourth pressure sensitive adhesion layer disposed between the input detection member and the window member.

10. The display device of claim 9, wherein each of the first to fourth pressure sensitive adhesion layers has the second adhesion force less than the first adhesion force.

11. The display device of claim 1, wherein the lower protection member comprises:

a first protection member comprising a flat part having a central area and a peripheral area adjacent to the central area and a support part which protrudes upward from the flat part; and a second protection member which is disposed between the first protection member and the display module, is disposed on the support part, is spaced apart from the flat part with a predetermined distance, and thereby defines a predetermined inner space in the central area.

12. The display device of claim 11, wherein the second protection member comprises:

a flexible bending part;

a first flat part connected to one end of the bending part and having rigidity relatively greater than that of the bending part; and a second flat part connected to an opposite end of the bending part and spaced apart from the first flat part with the bending part therebetween, the second flat part having rigidity relatively greater than that of the bending part.

13. The display device of claim 12, wherein the bending part includes the same material as that of each of the first and second flat parts and comprises a plurality of protrusion patterns.

14. The display device of claim 12, wherein the first protection member comprises:

a first sub protection member overlapping the first flat part on a plane; and a second sub protection member overlapping the second flat part on the plane, wherein the first sub protection member and the second sub protection member are spaced apart from each other on the plane.

15. The display device of claim 1, wherein the first adhesion member has a thickness of about 20 micrometers to about 80 micrometers, the second adhesion member has a thickness of about 20 micrometers to about 80 micrometers, and the adhesion member has a total thickness equal to or less than about 100 micrometers.

16. The display device of claim 15, wherein the second adhesion member has adhesion force of about 950 gram-force per inch to about 1,050 gram-force per inch, and the first adhesion member has adhesion force equal to or greater than about 1,050 gram-force per inch.

17. A display device comprising:

a display module which is folded with respect to a folding axis extending in one direction;

a lower protection member disposed below the display module; and an adhesion member disposed between the display module and the lower protection member such that the display module and the lower protection member adhere to each other, the adhesion member comprising:

a first adhesion member disposed on the lower protection member and having first adhesion force; and a second adhesion member disposed between the first adhesion member and the display module and having second adhesion force less than the first adhesion force.

18. The display device of claim 17, wherein the folding axis is defined below the lower protection member.

19. The display device of claim 17, wherein the second adhesion member has a stress-relaxation ratio of about 35 to about 45.

20. The display device of claim 17, wherein the second adhesion member has a storage modulus less than that of the first adhesion member, and the second adhesion member has the storage modulus of about $4.5 \times 10^4$ Pascal to about $5.5 \times 10^4$ Pascal.

* * * * *